(12) United States Patent
Kitani et al.

(10) Patent No.: US 7,395,429 B2
(45) Date of Patent: Jul. 1, 2008

(54) MUTUAL AUTHENTICATION METHOD, PROGRAM, RECORDING MEDIUM, SIGNAL PROCESSING SYSTEM, REPRODUCTION DEVICE, AND INFORMATION PROCESSING DEVICE

(75) Inventors: Satoshi Kitani, Tokyo (JP); Katsumi Muramatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 647 days.

(21) Appl. No.: 10/505,175

(22) PCT Filed: Dec. 18, 2003

(86) PCT No.: PCT/JP03/16226

§ 371 (c)(1),
(2), (4) Date: Aug. 31, 2004

(87) PCT Pub. No.: WO2004/064317

PCT Pub. Date: Jul. 29, 2004

(65) Prior Publication Data

US 2005/0160284 A1    Jul. 21, 2005

(30) Foreign Application Priority Data

Jan. 15, 2003    (JP)    ............................. 2003-006915

(51) Int. Cl.
*H04L 9/00* (2006.01)
*G06F 11/30* (2006.01)
*H04L 9/08* (2006.01)
*G09C 5/00* (2006.01)
*G06T 1/00* (2006.01)
*G11B 20/10* (2006.01)
*G11B 20/12* (2006.01)

(52) U.S. Cl. ...................................... 713/171; 713/193
(58) Field of Classification Search .................. 713/171
See application file for complete search history.

(56) References Cited

U.S. PATENT DOCUMENTS 6,460,137 B1 * 10/2002 Akiyama et al. ............ 713/160

(Continued)

FOREIGN PATENT DOCUMENTS

JP    2001-331106    11/2001

(Continued)

OTHER PUBLICATIONS

English Translation for JP 2005166185 A has been submitted on Feb. 15, 2008.*

(Continued)

*Primary Examiner*—Emmanuel I Moise
*Assistant Examiner*—Courtney D Fields
(74) *Attorney, Agent, or Firm*—Oblon, Spivak, McClelland, Maier & Neustadt, P.C.

(57) ABSTRACT

An MKB and a device key 121 of a drive are input to a process MKB 122. The process MKB 122 performs a revoking process for the drive. A process MKB 132 performs a revoking process for a host 103. The host 103 compares MAC values calculated by MAC calculating blocks 123 and 133. When the host 103 has determined that the two values are the same, the host 103 has successfully authenticated the drive 102. The drive 102 compares MAC values calculated by MAC calculating blocks 134 and 124 of the host 103. When the drive 102 has determined that the two values are the same, the drive 102 has successfully authenticated the host 103. When the mutual authentication has been successfully performed, the MAC calculating blocks 125 and 135 generate a common session key.

27 Claims, 13 Drawing Sheets

U.S. PATENT DOCUMENTS

| | | | | |
|---|---|---|---|---|
| 6,615,192 | B1* | 9/2003 | Tagawa et al. | 705/57 |
| 6,697,945 | B2* | 2/2004 | Ishiguro et al. | 713/171 |
| 6,912,634 | B2* | 6/2005 | Ripley et al. | 711/164 |
| 6,957,343 | B2* | 10/2005 | Ripley et al. | 713/193 |
| 6,993,135 | B2* | 1/2006 | Ishibashi | 380/277 |
| 7,065,648 | B1* | 6/2006 | Kamibayashi et al. | 713/171 |
| 7,111,175 | B2* | 9/2006 | Ripley | 713/193 |
| 7,155,591 | B2* | 12/2006 | Ripley et al. | 711/164 |
| 7,178,169 | B1* | 2/2007 | Salmonsen et al. | 726/31 |
| 2002/0087814 | A1* | 7/2002 | Ripley et al. | 711/154 |
| 2002/0087818 | A1* | 7/2002 | Ripley et al. | 711/164 |
| 2002/0141576 | A1* | 10/2002 | Ripley et al. | 380/201 |
| 2003/0188183 | A1* | 10/2003 | Lee et al. | 713/200 |
| 2004/0049648 | A1* | 3/2004 | Sato et al. | 711/164 |
| 2004/0131183 | A1* | 7/2004 | Sako | 380/202 |
| 2004/0205315 | A1* | 10/2004 | Ripley et al. | 711/163 |
| 2004/0228487 | A1* | 11/2004 | Maeda et al. | 380/232 |

FOREIGN PATENT DOCUMENTS

JP    2005166185 A * 6/2005

OTHER PUBLICATIONS

Mark D. Corner, Brian D. Noble; "Zero-Interaction Authentication", Sep. 2002, MobiCom '02: Proceedings of the 8th annual international conference on Mobile computing and networking, pp. 1-11□□.*

Tatebayashi, Makoto et al., "Kiroku Media no Contents Hogo System", 2000 Nen The Institute of Electronics, Information and Communication Engineers Kiso Kyokai Society Taikal Koen Ronbunshu, pp. 367-368 Sep. 7, 2000.

* cited by examiner

MUTUAL AUTHENTICATION METHOD, PROGRAM, RECORDING MEDIUM, SIGNAL PROCESSING SYSTEM, REPRODUCTION DEVICE, AND INFORMATION PROCESSING DEVICE

CROSS-REFERENCE TO RELATED APPLICATIONS

This application is filed under 35 U.S.C. §371 for PCT/JP03/16226, filed Dec. 18, 2003, and is based upon and claims priority under 35 U.S.C. §119 from Japanese Application No. JP 2003-6915, filed on Jan. 15, 2003.

BACKGROUND OF THE INVENTION

1. Field of the Invention

The present invention relates to a mutually authenticating method, a program, a recording medium, a signal processing system, a reproducing apparatus, and an information processing apparatus that cause a drive connected to for example a personal computer to record an encrypted content to a disc medium and to reproduce an encrypted content from a disc medium.

2. Background Art

On one recording medium such as a DVD (Digital Versatile Disc), which has been recently developed, a large capacity of data for one movie can be recorded as digital information. When video information and so forth can be recorded as digital information, it will become important to protect copyright of digital information against illegal copies.

In DVD-Video, as a copy protection technology, CSS (Content Scrambling System) has been employed. The use of the CSS is permitted for only DVD-ROM media, not recordable DVDs such as a DVD-R, a DVD-RW, a DVD+R, a DVD+RW, and so forth due to CSS contract. Thus, the CSS contract does not permit the user to copy the contents of a DVD-Video disc that has been copyright-protected in accordance with the CSS system to a recordable DVD (so-called bit-by-bit copy).

However, there was a serious situation of which the CSS encrypting system was broken. Illegal software called "DeCSS" that is capable of easily decrypting contents that has been encrypted in accordance with the CSS encryption system and copying the decrypted contents to a hard disk was published on the Internet. As a background of the advent of "DeCSS", reproduction software was designed with a CSS decryption key that was not anti-tampered although it was supposed to be anti-tampered. The reproduction software was reverse-engineered and the encryption key was decrypted. As a result, all the CSS algorithm was decrypted.

As a successor of the CSS, CPPM (Content Protection for Pre-Recorded Media) as a copyright protection technology for DVD-ROMs such as a DVD-Audio disc and CPRM (Content Protection for Recordable Media) as a copyright protection technology for recordable DVDs and memory cards have been proposed. In these systems, even if there is a problem about encryption for contents, storage of management information, and so forth, the systems can be updated. Even if data of a whole disc is copied, the reproduction can be restricted. A method for protecting copyright for DVDs is described in the following non-patent related art reference 1. The CPRM is described in the following document distributed by its licenser, 4C Entity, LLC, USA.

"Spreading-out Copyright Protection Space Starting from DVD", Yamada, Nikkei Electronics, pp. 143-153, 2001.8.13.

"Content Protection for Recordable Media Specification DVD Book", Internet <URL: http://www.4Centrity.com/>

In a personal computer (hereinafter, sometimes abbreviated as PC) environment, since a PC and a drive are connected with a standard interface, secret data may be leaked out or tampered at the standard interface. As a result, there is a risk of which application software may be reverse-engineered and secret information may be stolen or tampered. Such a risk hardly occurs in an electronic apparatus that has a recording and reproducing apparatus that is integrated thereinto.

When a copyright protection technology is implemented to an application program that is executed on a PC, to prevent the copyright protection technology from being analyzed, the application program is generally anti-tampered. However, there is no index that represents the strength of tamper-resistance. As a result, countermeasures against reverse-engineering depend on the decision and capability of each implementer. Thus, the CSS was broken. The copyright protecting technologies CPPM and CPRM for recordable DVDs, which were proposed as a successor of the CSS are based on the known CSS and have new additional functions. In addition, most of algorithms of copyright protection technologies depend on implementation to a PC. Thus, it cannot be said that they have strong content protection functions. In other words, an encrypting system would be broken by analyzing secret information of a copyright protection technology for example reverse-engineering using application software. Encrypted content read as data from a disc by a PC would be decrypted by decrypting software such as "DeCSS". The decrypted data would be repeatedly copied as a clear content in non-copy-protection state. Thus, there was a risk of which the copyright protection would not work.

BRIEF SUMMARY OF THE INVENTION

An object of the present invention is to provide a mutual authenticating method, a program, a recording medium, a signal processing system, a reproducing apparatus, and an information processing apparatus that allow safety of a copyright protection technology in a PC environment to be secured.

To solve the foregoing problem, a first aspect of the present invention is a mutually authenticating method for mutually authenticating a reproducing apparatus and an information processing apparatus, the reproducing apparatus comprising a reproducing portion for reading content information from a recording medium having revocation information and information unique to the recording medium, the revocation information being used to determine whether or not an electronic device is illegal, the reproducing apparatus being configured to transmit and receive the content information to and from the information processing apparatus for processing the content information, the mutually authenticating method comprising the steps of:

causing the reproducing apparatus to determine whether or not the reproducing apparatus itself should be invalidated using information that represents the reproducing apparatus and the revocation information;

causing the information processing apparatus to determine whether or not the information processing apparatus itself should be invalidated using the information that represents the information processing apparatus and the revocation information; and causing the reproducing apparatus and the information processing apparatus to mutually authenticate each other using both first key information generated when the determined result at the first determining step does not represent that the reproducing apparatus should be invalidated and second key information generated when the determined result at the second determining step does not represent that information processing apparatus should be invalidated.

A second aspect of the present invention is a program for a mutually authenticating method for mutually authenticating a reproducing apparatus and an information processing apparatus, the reproducing apparatus comprising a reproducing portion for reading content information from a recording medium having revocation information and information unique to the recording medium, the revocation information being used to determine whether or not an electronic device is illegal, the reproducing apparatus being configured to transmit and receive the content information to and from the information processing apparatus for processing the content information, the mutually authenticating method comprising the steps of:

causing the reproducing apparatus to determine whether or not the reproducing apparatus itself should be invalidated using information that represents the reproducing apparatus and the revocation information;

causing the information processing apparatus to determine whether or not the information processing apparatus itself should be invalidated using the information that represents the information processing apparatus and the revocation information; and causing the reproducing apparatus and the information processing apparatus to mutually authenticate each other using both first key information generated when the determined result at the first determining step does not represent that the reproducing apparatus should be invalidated and second key information generated when the determined result at the second determining step does not represent that information processing apparatus should be invalidated.

A third aspect of the present invention is a recording medium on which a program for a mutually authenticating method is stored, the mutually authenticating method being adapted for mutually authenticating a reproducing apparatus and an information processing apparatus, the reproducing apparatus comprising a reproducing portion for reading content information from a recording medium having revocation information and information unique to the recording medium, the revocation information being used to determine whether or not an electronic device is illegal, the reproducing apparatus being configured to transmit and receive the content information to and from the information processing apparatus for processing the content information, the mutually authenticating method comprising the steps of:

causing the reproducing apparatus to determine whether or not the reproducing apparatus itself should be invalidated using information that represents the reproducing apparatus and the revocation information;

causing the information processing apparatus to determine whether or not the information processing apparatus itself should be invalidated using the information that represents the information processing apparatus and the revocation information; and causing the reproducing apparatus and the information processing apparatus to mutually authenticate each other using both first key information generated when the determined result at the first determining step does not represent that the reproducing apparatus should be invalidated and second key information generated when the determined result at the second determining step does not represent that information processing apparatus should be invalidated.

A fourth aspect of the present invention is a signal processing system comprising a reproducing apparatus and an information processing apparatus, the reproducing apparatus comprising a reproducing portion for reading content information from a recording medium having revocation information and information unique to the recording medium, the revocation information being used to determine whether or not an electronic device is illegal, the reproducing apparatus being configured to transmit and receive the content information to and from the information processing apparatus for processing the content information, wherein the reproducing apparatus further comprises:
first determining means for determining whether or not the reproducing apparatus itself should be invalidated using information that represents the reproducing apparatus and the revocation information, wherein the information processing apparatus comprises:
second determining means for determining whether or not the information processing apparatus itself should be invalidated using the information that represents the information processing apparatus and the revocation information, and wherein the signal processing system further comprises:
mutually authenticating means for causing the reproducing apparatus and the information processing apparatus to mutually authenticate each other using both first key information generated when the determined result of the first determining means does not represent that the reproducing apparatus should be invalidated and second key information generated when the determined result of the second determining means does not represent that information processing apparatus should be invalidated; and common key generating means for generating a common key that is in common with the reproducing apparatus and the information processing apparatus after the mutually authenticating means has mutually authenticated the reproducing apparatus and the information processing apparatus.

A fifth aspect of the present invention is a reproducing apparatus for a signal processing system, the reproducing apparatus comprising a reproducing portion for reading content information from a recording medium having revocation information and information unique to the recording medium, the revocation information being used to determine whether or not an electronic device is illegal, the reproducing apparatus being configured to transmit the content information to an information processing apparatus for processing the content information, wherein the reproducing apparatus further comprises:
first determining means for determining whether or not the reproducing apparatus itself should be invalidated using information that represents the reproducing apparatus and the revocation information;

mutually authenticating means for mutually authenticating the information processing apparatus using both first key information generated when the determined result of the first determining means does not represent that the reproducing apparatus should be invalidated and second key information generated when the determined result of a second determining means does not represent that information processing apparatus should be invalidated; and common key generating means for generating a common key that is in common with the information processing apparatus after the mutually authenticating means has mutually authenticated the information processing apparatus.

A sixth aspect of the present invention is an information processing apparatus for receiving content information from a reproducing apparatus through transferring means, the content information being read from a recording medium having revocation information and information unique to the recording medium, the revocation information being used to determine whether or not an electronic device is illegal, the information processing apparatus being configured to process the content information, the information processing apparatus comprising:

second determining means for determining whether or not the information processing apparatus itself should be invalidated using first key information, information that represents the information processing apparatus, and the revocation information, the first key information being generated when a determined result of first determining means of the reproducing apparatus does not represent that the reproducing apparatus itself should be invalidated using information that represents the reproducing apparatus and the revocation information;

mutually authenticating means for mutually authenticating the reproducing apparatus using both the first key information and second key information generated when the determined result of the second determining means does not represent that information processing apparatus itself should be invalidated; and common key generating means for generating a common key that is in common with the reproducing apparatus after the mutually authenticating means has mutually authenticated the reproducing apparatus.

According to the present invention, mutual authentication is performed using key information (medium key) of which key information (MKB) recorded on a medium and key information (device key) stored in each device or each application are obtained as the same value. Thus, according to the present invention, since a special authentication key dedicated for authentication is not required, the amount of secret information can be decreased. In addition, since a device or an application has a device key that can be varied, the risk of which secret information is illegally read can be decreased.

According to the present invention, information unique to an electronic device or application software for example device key that is secret information of a copyright protection technology is implemented in the drive. Thus, application software installed in the information processing apparatus does not need to have all secret information of the copyright protection technology. Thus, the system according to the present invention is capable of having tamper-resistance for secret information against reverse-engineering for software and securing safety of the copyright technology.

According to the present invention, since the recording and reproducing apparatus has a device key as information unique to an electronic device, the recording and reproducing apparatus itself can be revoked. According to the present invention, since random number information necessary for calculating a content key in the information processing apparatus can be generated by for example an LSI in the recording and reproducing apparatus, a true random number or a random number close thereto can be generated in comparison with the case that a random number is generated by software in a PC. Thus, the risk of which a random number is replaced with a fixed value can be suppressed.

BRIEF DESCRIPTION OF THE SEVERAL VIEWS OF THE DRAWING(S)

DETAILED DESCRIPTION OF THE INVENTION

Figure 1:
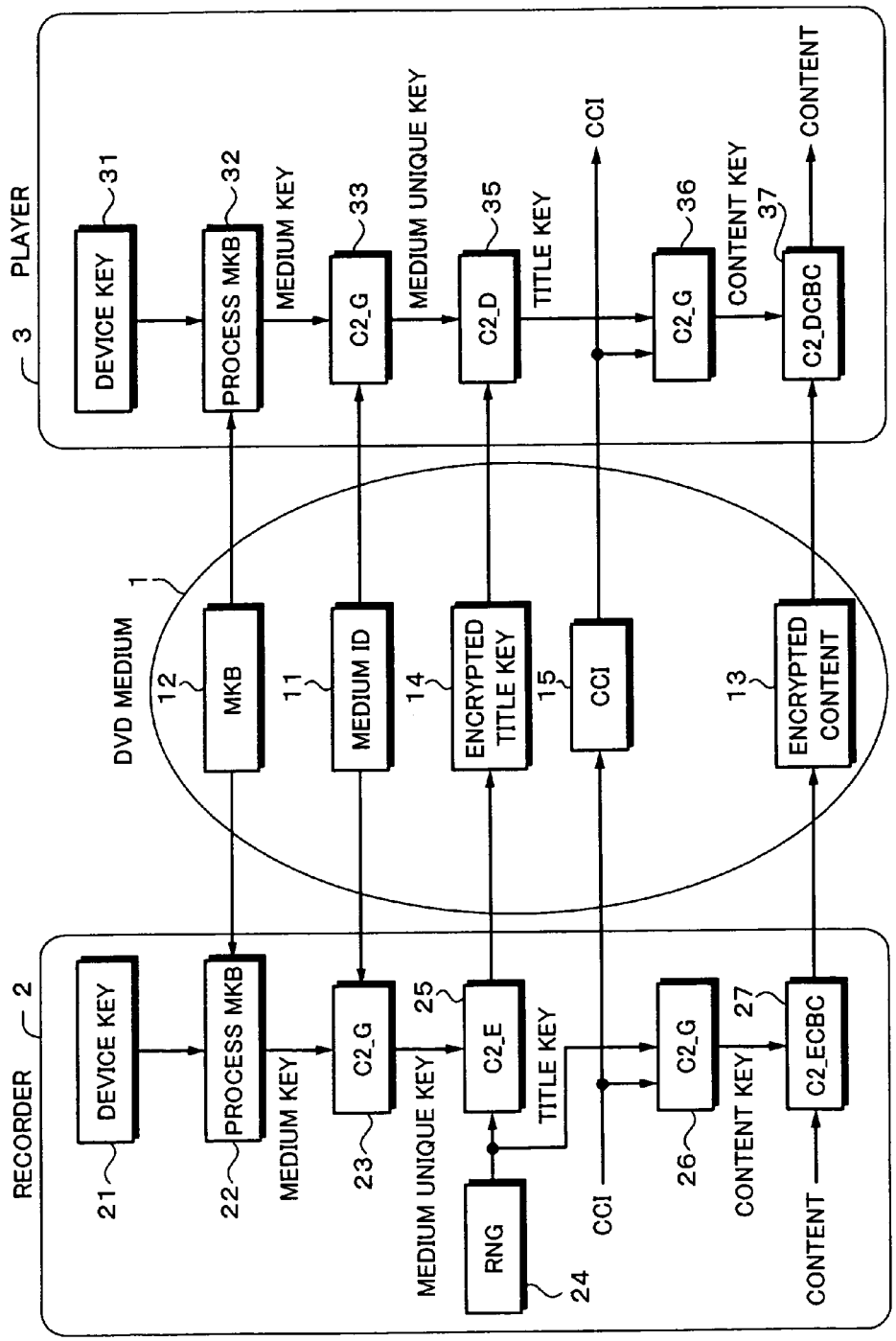
FIG. 1 is a block diagram describing a proposed system composed of a recorder, a player, and a DVD medium.

Next, before embodiments of the present invention is described, the relation between terminology used in the claims and terminology used in the embodiments will be described.

Recording medium: medium, for example a disc, reproducing apparatus: drive, information processing apparatus: host, transferring means: drive-host interface, signal processing system: system of which the drive that reproduces data from a medium and the host are connected through the drive-host interface. First transmitting means: means for transmitting information from the drive side to the host side in accordance with a common key encrypting system using a session key as a common key, second transmitting means: means for reversely transmitting information from the host side to the drive side using a session key as a common key.

Content information: information recorded on a medium or information to be recorded is content information. Revocation information: a medium key block MKB pre-recorded on a medium. Information unique to a recording medium: medium ID. Device key: information that represents a reproducing apparatus or an information processing apparatus. Determining means for determining whether or not an apparatus should be invalidated: a process MKB. When a first determining means on the drive side has not invalidated the drive itself, the process MKB generates first key information as a medium key on the drive side. When a second determining means on the host side has not invalidated the host itself, the process MKB generates second key information as a medium key on the host side. The drive and host can be independently invalidated. When the drive and host are invalidated, expected medium keys cannot be obtained. Thus, the first key information and the second key information are designated.

Mutually authenticating means: AKE (Authentication and Key Exchange) (first confirming means on the drive side and second confirming means perform a random number exchanging operation, a MAC calculating operation, and a comparing operation after the process MKB so as to mutually confirm operations of the remote parties. Since the operation on the drive side and the operation on the host side can be confirmed in any order, to unify the terminology, the confirming means on the drive side is designated as "first".

Common key: a session key (a session key and a content key that are securely used to encrypt and decrypt data are referred to as "keys"; other than these keys is referred to as "key information". After the drive and the host have been authenticated, as a common key, the same encryption key is generated. Since the name of the key information that a portion generates on the drive side is different from that on the host side, the generating means on the drive side and the generating means on the host side are referred to as first common key generating means and second common key generating means, respectively).

Random number generating means for generating a random number: a random number generator (RNG) (random number generating means on the drive side is referred to as first random number generating means, whereas random number generating means on the host side is referred to as second random number generating means. In claims, random numbers that are generated are successively numbered in the order of appearance).

Calculating means for performing a predetermined calculation: a MAC (Message Authentication Code) calculating block (means for performing a calculation using a random number exchanged by random number exchanging means on the drive side is referred to as first calculating means, whereas calculating means on the host side is referred to as second calculating means).

Comparing means: a comparing portion (a comparing portion on the drive side is referred to as first comparing means, whereas a comparing portion on the host side is referred to as second comparing means).

Key information unique to a recording medium: a medium unique key (according to an embodiment of the present invention, to allow a medium unique key to have tamper-resistance, the medium unique key is generated on only the drive side. Thus, intermediate key generating means for generating key information (medium unique key) unique to a recording medium is disposed on only the drive side).

Key information as a source of a content information encryption key or a content information decryption key (a title key used when data is recorded is referred to as third key information, whereas a title key used when data is reproduced is referred to as fourth key information. Means for encrypting the tile key using a medium unique key is referred to as key information encrypting means, whereas means for decrypting the title key using the medium unique key is referred to as key information decrypting means. Means for recording the title key encrypted using the medium unique key is referred to as encryption key information recording means).

A key for which content information is encrypted or decrypted: a content key (a content key used when data is recorded is referred to as a content information encryption key, whereas a content key used when data is reproduced is referred to as a content information decryption key. Means for generating the content information encryption key is referred to as final encryption key generating means, whereas means for generating the content information decryption key is referred to as final decryption key generating means. Means for recording encrypted content information to a recording medium is referred to as content information recording means, whereas means for decrypting encrypted content information is referred to as content information decrypting means).

For easy understanding of the present invention, first of all, with reference to FIG. 1, a copyright protection technology for example an architecture of the CPRM for DVDs will be described. In FIG. 1, reference numeral 1 represents for example a recordable DVD medium such as DVD–R/RW or DVD-RAM based on the CPRM standard. Reference numeral 2 represents for example a recorder based on the CPRM standard. Reference numeral 3 represents for example a player based on the CPRM standard. The recorder 2 and the player 3 are each an apparatus or application software.

In a blank state of the DVD medium 1, in areas called BCA (Burst Cutting Area) or NBCA (Narrow Burst Cutting Area) of a lead-in area on the innermost periphery side of the DVD medium 1, a medium ID 11 is recorded. In an emboss or pre-recorded data zone of the lead-in area, a medium key block (hereinafter sometimes abbreviated as MKB) 12 is pre-recorded. The medium ID 11 is a number that is unique to each medium for example disc. The medium ID 11 is composed of a medium manufacturer code and a serial number. The medium ID 11 is required when a medium key is converted into a medium unique key that is unique to each medium. A medium key block MKB is a bundle of keys to obtain a medium key and revoke the apparatus. The medium ID and medium key block are first information unique to the recording medium.

In a data rewritable or recordable region of the disc 1, an encrypted content 13 that is encrypted with a content key is recorded. As an encrypting system, C2 (Cryptomeria Ciphering) is used.

On the DVD medium 1, an encrypted title key 14 and a CCI (Copy Control Information) 15 are recorded. The encrypted title key 14 is encrypted title key information. The title key information is key information that is added for each title. The CCI is copy control information such as copy no more, copy once, copy free, or the like.

The recorder 2 comprises structural elements that are a device key 21, a process MKB 22, a C2_G 23, a random number generator 24, a C2_E 25, a C2_G 26, and a C2_ECBC 27. The player 3 comprises a device key 31, a process MKB 32, a C2_G 33, a C2_D 35, a C2_G 36 and a C2_DCBC 37.

The device keys 21 and 31 are identification numbers issued for each apparatus maker or each application software vendor. A device key is information unique to a valid electronic apparatus or valid application software assigned by a licenser. The MKB 12 and the device key 21 reproduced from the DVD medium 1 are calculated by the process MKB 22 so as to determine whether or not the electronic apparatus or application software has been revoked. Like the recorder 2, in the player 3, the MKB 12 and the device key 31 are calculated b the process MKB 32 so as to determine whether or not the player 3 has been revoked.

The processes MKB 22 and 32 each calculate a medium key with the MKB 12 and the device keys 21 and 31. When the MKB 12 does not contain a device key of the recorder 2 or the player 3 and the calculated result matches a predetermined value for example 0, it is determined that the recorder 2 or player 3 that has the device key is not valid. In other words, the recorder 2 or player 3 is revoked.

The C2_G 23 and the C2_G 33 are processes each of which calculates a medium key and a medium ID and obtains a medium unique key.

The random number generator (RNG) 24 is used to generate a title key. A title key generated by the random number generator 24 is input to the C2_E 25. The title key is encrypted with a medium unique key. The encrypted title key 14 is recorded on the DVD medium 1.

In the player 3, the encrypted title key 14 and the medium unique key reproduced from the DVD medium 1 are supplied to the C2_D 35. The encrypted title key is decrypted with the medium unique key. As a result, the title key is obtained.

In the recorder 2, the CCI and the title key are supplied to the C2_G 26. The C2_G 26 obtains a content key. The content key is supplied to the C2_ECBC 27. The C2_ECBC 27 encrypts a content with the content key. The encrypted content 13 is recorded on the DVD medium 1.

In the player 3, the CCI and the title key are supplied to the C2_G 36. The C2_G 36 obtains a content key. The content key is supplied to the C2_ECBC 37. The encrypted content 13 reproduced from the DVD medium 1 is decrypted with the content key.

In the structure shown in FIG. 1, a recording process for the recorder 2 will be described. The recorder 2 reads the MKB 12 from the DVD medium 1. The process MKB 22 calculates the device key 21 and the MKB 12 and obtains a medium key. When the calculated result matches a predetermined value, it is determined that the device key 21 (the apparatus or application of the recorder 2) has been revoked by the MKB. At that point, the recorder 2 stops the current process and prohibits a content from being recorded to the DVD medium 1. If the value of the medium key does not match the predetermined value, the recorder 2 continues the current process.

The recorder 2 reads the medium ID 11 from the DVD medium 1 and inputs the medium ID and the medium key to the C2_G 23. The C2_G 23 calculates the medium ID and the medium key and obtains a medium unique key that is unique to each medium. The title key generated by the random number generator 24 is encrypted by the C2_E 25. The encrypted title key 14 is recorded on the DVD medium 1. The title key and the CCI information of the content are calculated by the C2_G 26. As a result, the C2_G 26 obtains a content key. The C2_ECBC 27 encrypts the content with the content key. The encrypted content 13 and the CCI 15 are recorded on the DVD medium 1.

Next, a reproducing process of the player 3 will be described. First of all, the MKB 12 is read from the DVD medium 1. The device key 31 and the MKB 12 are calculated so as to determine whether or not the device key 31 has been revoked. When the device key 31 namely the apparatus or application of the player 3 has not been revoked, a medium unique key is calculated with the medium ID. With the encrypted title key 14 and the medium unique key, a title key is calculated. The title key and the CCI 15 are input to the C2_G 36. As a result, a content key is obtained. The content key is input to the C2_DCBC 37. The C2_DCBC 37 calculates the encrypted content 13 reproduced from the DVD medium 1 with the content key. As a result, the encrypted content 13 is decrypted.

To obtain a content key necessary for decrypting a content, a unique medium ID is required for each DVD medium. Thus, even if an encrypted content on a medium is copied to another medium, since the medium ID of the other medium is different from the medium ID of the original medium, the copied content cannot be decrypted. As a result, the copyright of the content can be protected.

Figure 2:
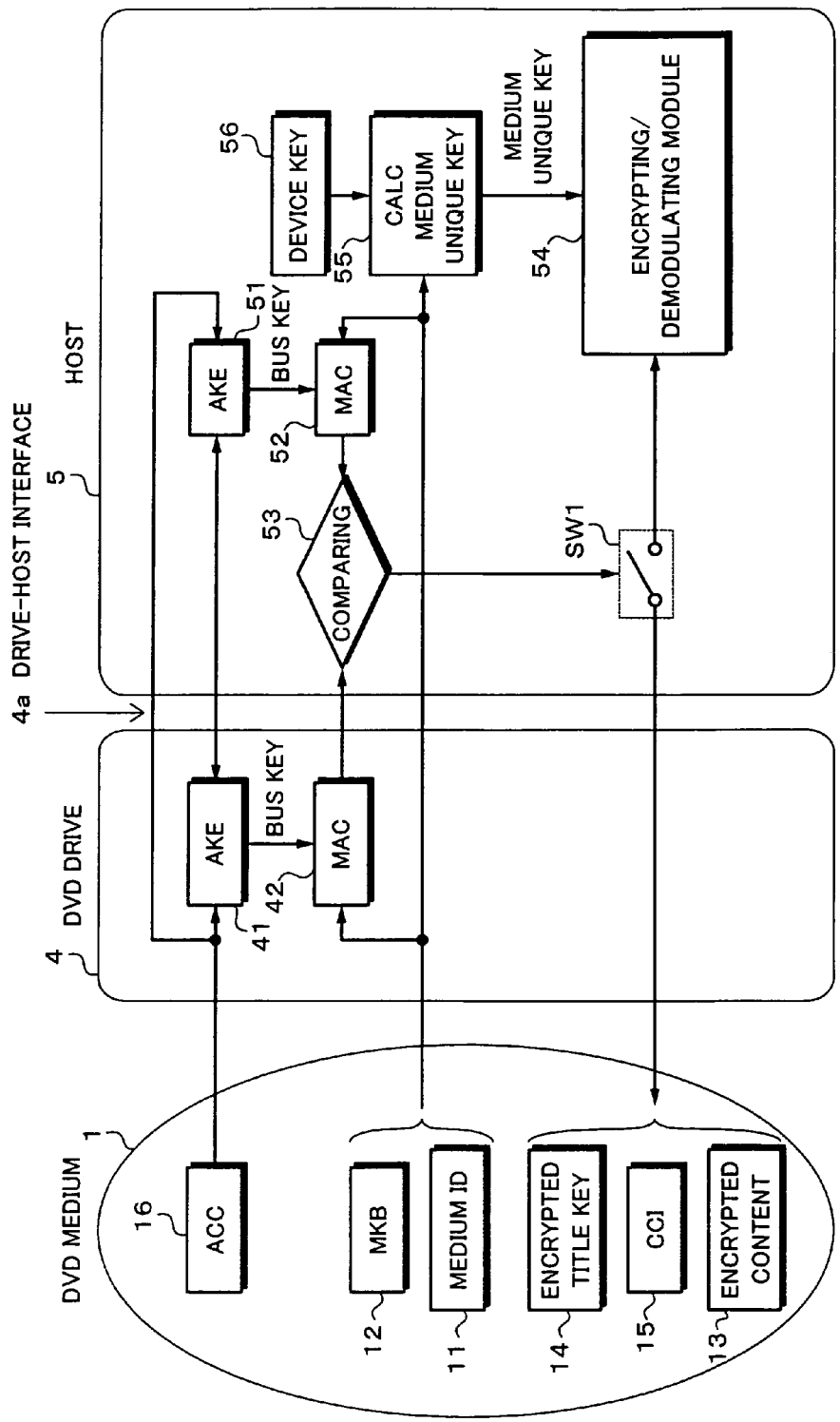
FIG. 2 is a block diagram describing a PC based DVD medium recording and reproducing system.

The structure shown in FIG. 1 is a recording and reproducing apparatus. The present invention is applied to the case that the content protecting process for the DVD medium 1 is performed under a PC environment. Next, with reference to FIG. 2, roles shared by a PC and a drive according to a conventional system will be described. In FIG. 2, reference numeral 4 represents a DVD drive as a recording and reproducing apparatus that records and reproduces a content to and from a DVD medium 1 based on the foregoing CPRM standard will be described.

Reference numeral 5 represents a host for example a PC as a data processing apparatus. The host 5 is an apparatus or application software that can handle a content that can be recorded to the DVD medium 1 and reproduced therefrom and that is connected to the DVD drive 4. The host 5 is composed of for example application software and a PC in which the application software is installed.

The DVD drive 4 and the host 5 are connected with an interface 4a. The interface 4a is for example ATAPI (AT Attachment with Packet Interface), SCSI (Small Computer System Interface), USB (Universal Serial Bus), IEEE (Institute of Electrical and Electronics Engineers) 1394, or the like.

On the DVD medium 1, a medium ID 11, a medium key block 12, and a ACC (Authentication Control Code) are prerecorded. The ACC is data recorded on the DVD medium 1. The ACC causes the DVD drive 4 and the host 5 to authenticate each other uniquely for each DVD medium 1.

The DVD drive 4 reads an ACC 16 from the DVD medium 1. The ACC 16 that is read from the DVD medium 1 is input to an AKE (Authentication and Key Exchange) 41 of the DVD drive 4. In addition, the ACC 16 is transferred to the host 5. The host 5 inputs the received ACC to an AKE 51. The AKEs 41 and 51 exchange random number data and generates a common session key (referred to as bus key) that varies in each authenticating operation with the exchanged random numbers and the value of the ACC.

The bus key is supplied to MAC (Message Authentication Code) calculating blocks 42 and 52. The MAC calculating blocks 42 and 52 are processes that calculate a medium ID and a MAC of the medium key block 12 with the obtained bus keys as parameters obtained by the AKEs 41 and 51. The host 5 uses the MAC calculating blocks 42 and 52 so as to determine whether or not the MKB and medium ID have integrity.

A comparing portion 53 of the host 5 compares the MACs calculated by the MACs 42 and 52 and determines whether or not they match. When the values of the MACs match, it is confirmed that the MKB and the medium ID have integrity. A switch SW1 is controlled in accordance with the compared output.

The switch SW1 turns on/off a signal path between a recording path or a reproducing path of the DVD medium 1 of the DVD drive 4 and an encrypting/(or) decrypting module 54 of the host 5. The switch SW1 represents on/off of the signal path. Actually, the switch SW1 represents that when the signal path is turned on, the process of the host 5 is continued and that when the signal path is turned off, the process of the host 5 is stopped. The encrypting/decrypting module 54 is a calculating block that calculates a content key with a medium unique key, an encrypted title key, and a CCI, encrypts a content with the content key, obtains an encrypted content 13 or decrypts the encrypted content 13 with the content key.

A medium unique key calculating block 55 is a calculating block that calculates a medium unique key with the MKB 12, the medium ID, and a device key 56. Like the recorder or player shown in FIG. 1, the medium unique key calculating block 55 calculates a medium key with the device key and the MKB 12. The medium unique key calculating block 55 calculates a medium unique key with the medium key and the medium IC 11. When the medium key is a predetermined value, it is determined that the electronic apparatus or application software is not valid. As a result, the electronic apparatus or application software is revoked. Thus, the medium unique key calculating block 55 also functions as a revoke processing portion that revokes the electronic apparatus or application software.

When a content is recorded, if the result of the comparing portion 53 has confirmed integrity, the switch SW1 is turned on. At that point, the encrypted content 13, the encrypted title key 14, and the CCI 15 are supplied from the encrypting/decrypting module 54 to the DVD drive 4 through the switch SW1. As a result, the encrypted content 13, the encrypted title key 14, and the CCI 15 are recorded to the DVD medium 1. When a content is reproduced, if the result of the comparing portion 53 has confirmed integrity, the SW1 is turned on. At that point, the encrypted content 13, the encrypted title key 14, and the CCI 15 reproduced from the DVD medium 1 are supplied to the encrypting/decrypting module 54 through the switch SW1. The encrypting/decrypting module 54 decrypts the encrypted content.

Figure 3:
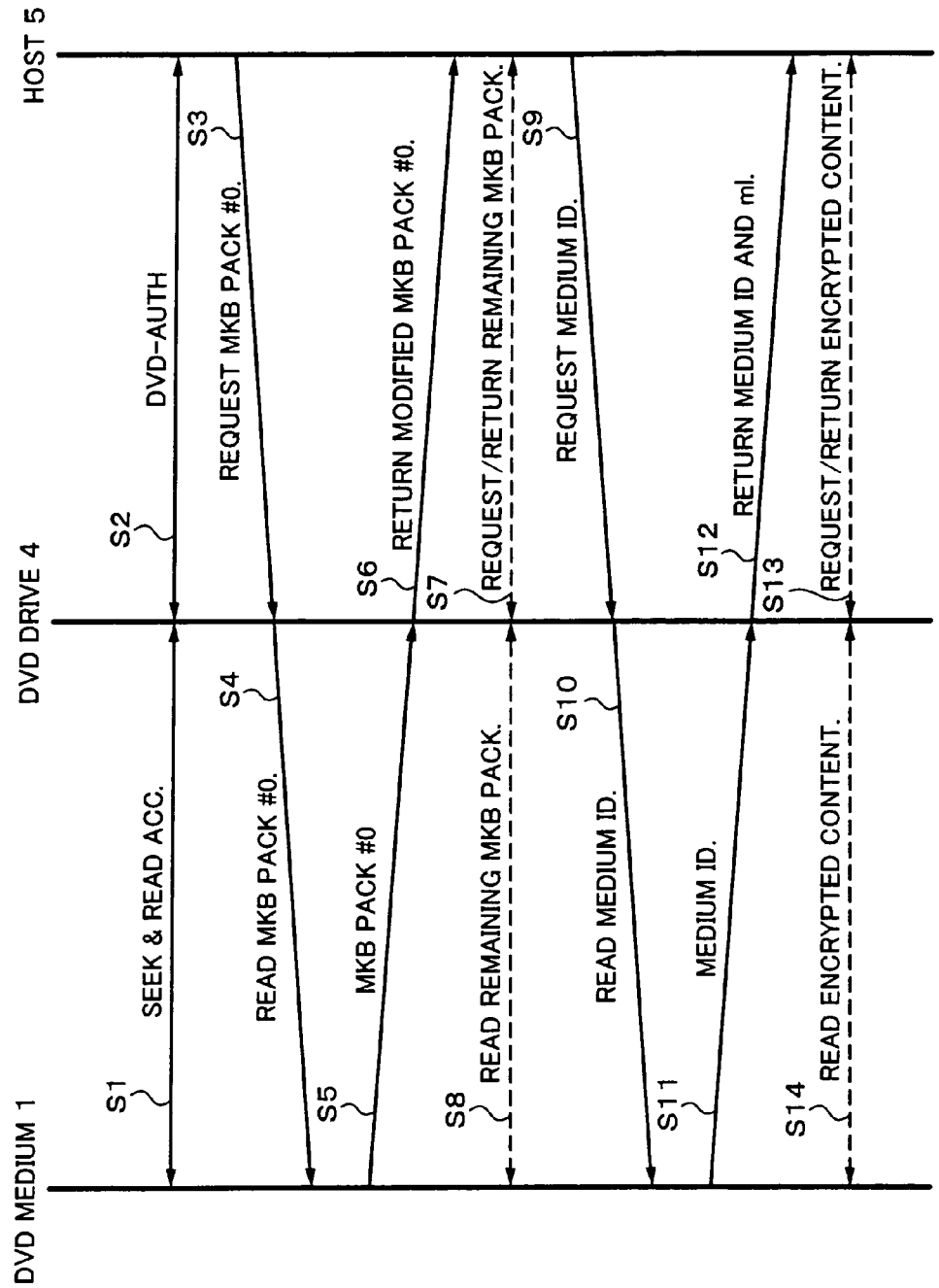
FIG. 3 is a schematic diagram describing steps of processes of a DVD drive 4 and a host 5 of the system shown in FIG. 2.

FIG. 3 shows steps of a process for exchanging signals among the DVD medium 1, the DVD drive 4, and the host 5 in the system using the DVD medium under the conventional PC environment shown in FIG. 2. The host 5 sends a command to the DVD drive 4. The DVD drive 4 performs an operation in accordance with the command.

In response to the command received from the host 5, the ACC of the DVD medium 1 is sought and read (at step S1). At the next step S2, the ACC is input to the AKE 41. In addition, the ACC is transferred to the host 5. In the host 5, the received ACC is input to the AKE 51. The AKEs 41 and 51 exchange random number data. The AKEs 41 and 51 generate a bus key as a session key that varies in each session with the exchanged random numbers and the value of the ACC 16. The bus key is shared by the DVD drive 4 and the host 5. When a mutual authentication has not been successful, the process is stopped.

Whenever the disc is detected or the disc is changed after the power is turned on, an authenticating operation is performed. When a recording operation is performed with the recording button or a reproducing operation is performed with the play button, an authenticating operation may be performed. For example, when the record button or play button is pressed, an authenticating operation is performed.

When authentication has been successful, at step S3, the host 5 requests the DVD drive 4 to read a MKB (medium key block) pack #0 from the DVD medium 1. MKB pack 0 to pack 15 of 16 sectors are recorded repeatedly 12 times in the lead-in area. The error correction code encoding process is performed in the unit of one pack.

At step S4, the DVD drive 4 reads the MKB pack #0. At step S5, the pack #0 is read. The DVD drive 4 returns a modified MKB to the host 5 (at step S6). When the DVD drive 4 reads an MKB, the DVD drive 4 calculates a MAC value with a bus key as a parameter, adds the MAC value to the MKB, and transfers the resultant data to the host 5. At steps S7 and S8, the requesting operation, the reading operation, and the transferring operation are repeatedly performed for the remaining MKB packs other than the pack #0 namely until for example the pack #15 is read and transferred to the host 5.

The host 5 requests a medium ID of the DVD drive 4. The DVD drive 4 reads the medium ID from the DVD medium 1. At step S11, the medium ID is read. When the DVD drive 4 reads the medium ID from the DVD medium 1, the DVD drive 4 calculates the MAC value with the bus key as a parameter. At step S12, the DVD drive 4 adds a MAC value m1 to the medium ID and transfers the resultant data to the host 5.

The host 5 calculates the MAC value with parameters of the MKB 12 received from the DVD drive 4 and the bus key received from the medium ID 11. The comparing portion 53 compares the calculated MAC value with the MAC value received from the DVD drive 4. When they match, the host 5 determines that the received MKB and medium ID are valid and turns on the switch SW1 so as to cause the process to advance. In contrast, when they do not match, the host 5 determines that the received MKB and medium ID have been revoked and turns off the switch SW1 so as to cause the process to stop.

At step S13, the host 5 requests an encrypted content of the DVD drive 4. At step S14, the DVD drive 4 reads the encrypted content from the DVD drive 4. At step S13, the encrypted content is transferred to the host 5. The medium unique key calculating block 55 of the host 5 calculates a medium unique key with the device key 56, the MKB 12, and the medium ID 11. The medium unique key is supplied to the encrypting/decrypting module 54. The encrypting/decrypting module 54 obtains a content key with the encrypted title key 14 and the CCI 15. The encrypting/decrypting module 54 decrypts the encrypted content that is read from the DVD medium 1 with the content key. The encrypting/decrypting module 54 encrypts a content that is recorded to the DVD medium 1.

Figure 4:
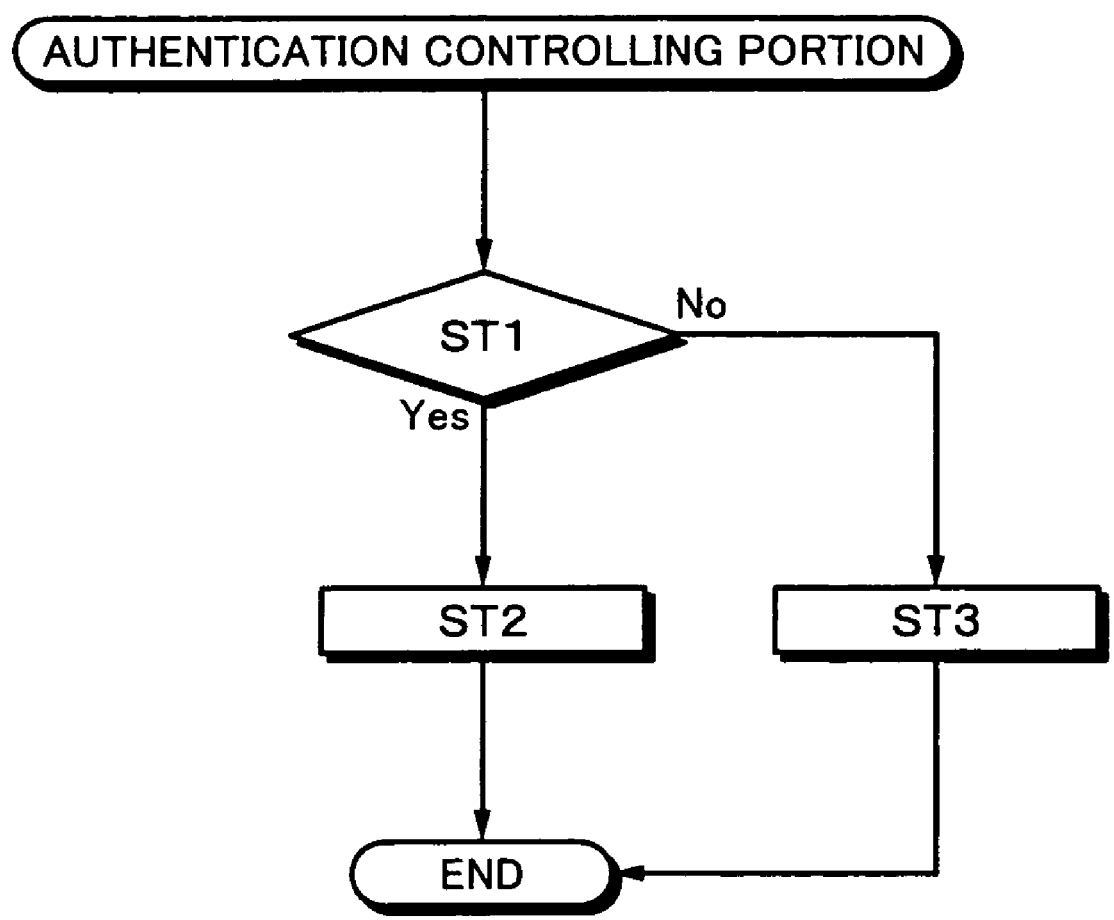
FIG. 4 is a flow chart describing an authenticating operation of the system shown in FIG. 2.

At step ST1 of a flow chart shown in FIG. 4, a MAC calculated value obtained with a bus key as a parameter by the MAC calculating block 42 is compared with a MAC calculated value obtained with a bus key as a parameter by the comparing portion 53. When they match, at step ST2, the switch SW1 is turned on. When they do not match, at step ST3, the switch SW1 is turned off and the process is stopped.

The foregoing CPRM uses the same bus key generating method as the CSS, which is a copyright protection technology for the DVD-Video. Although the contents of the CSS authenticating system is supposed to be secret, it has been analyzed and can be operated by free software that has not been permitted by DVD-CCA, which is a CSS license management organization. In addition, a content protecting process is performed on the host side. In other words, all a revocation determining process, a medium key obtaining process, a medium unique key obtaining process, a title key generating process, a title key obtaining processes, a content key obtaining process, a content encrypting process, and a content decrypting process are performed on the host side. Thus, the reliability of the copyright protection technology deteriorates.

An embodiment of the present invention is to solve such a problem. According to the embodiment, a revocation operation in roles shared by a PC and a drive and information (device key) for obtaining a media key are disposed in a drive. After the drive and the PC mutually authenticates each other, the session key is obtained.

Figure 5:
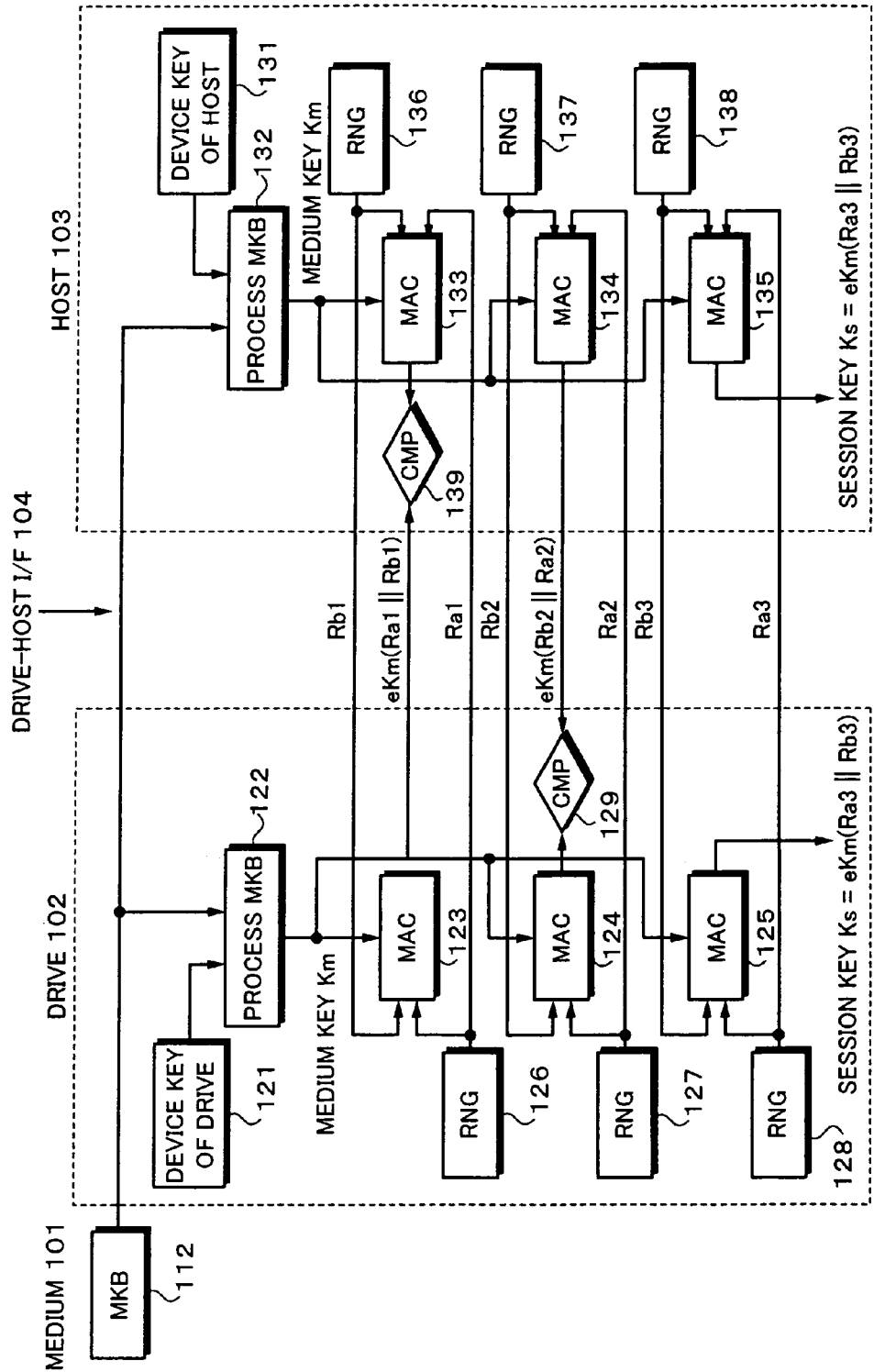
FIG. 5 is a block diagram showing a structure for performing mutual authentication according to an embodiment of the present invention.
Figure 6:
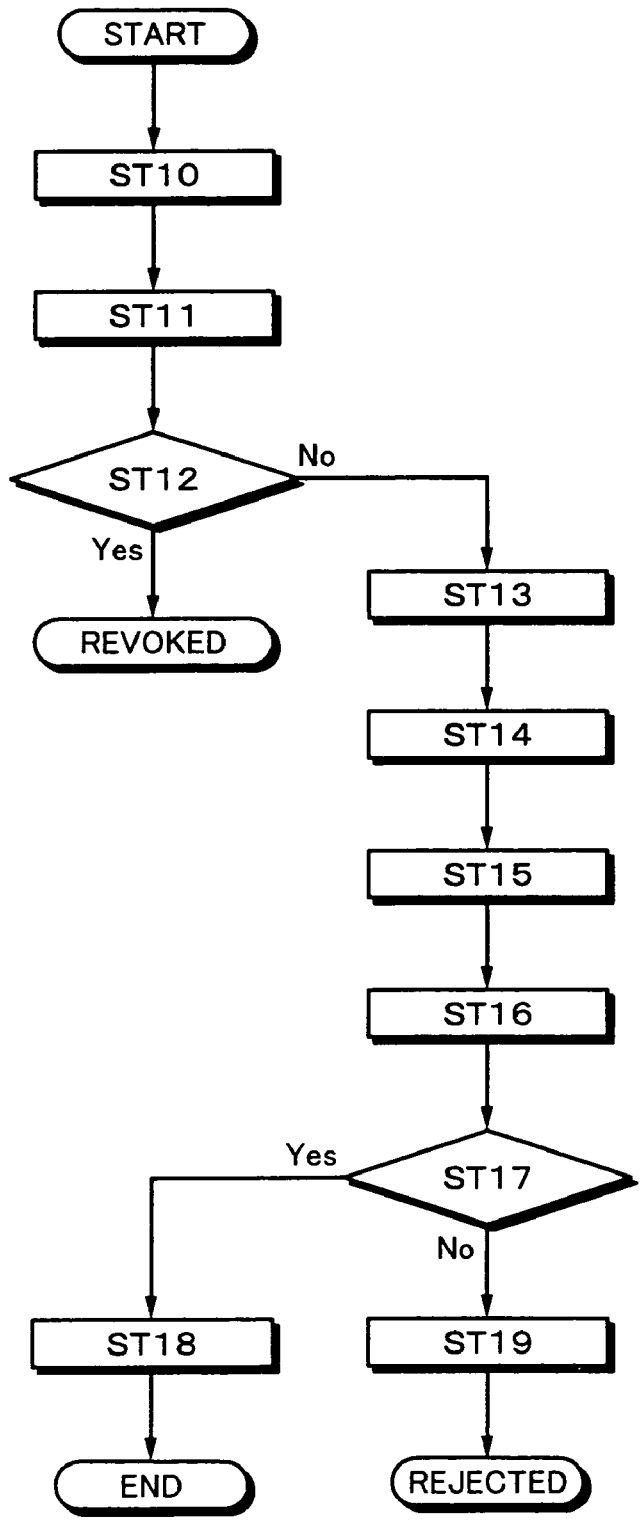
FIG. 6 is a flow chart describing steps of a process of an authenticating operation of the drive according to the embodiment of the present invention.
Figure 7:
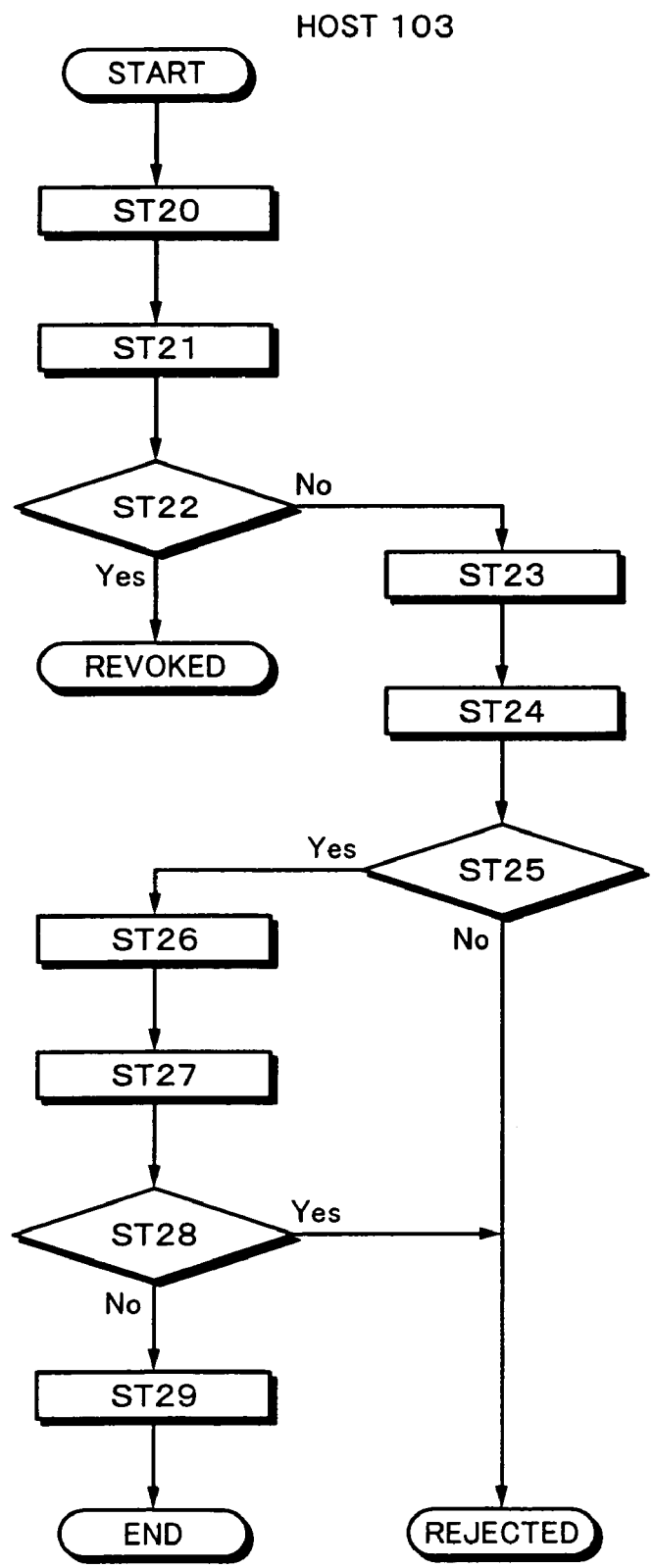
FIG. 7 is a flow chart describing steps of a process of an authenticating operation of the host according to the embodiment of the present invention.

FIG. 5 is a block diagram showing a structure for performing the mutual authentication according to the embodiment. FIG. 6 is a flow chart showing a process on the drive side. FIG. 7 is a flow chart showing a process on the host side. In the following description, reference numeral 101 represents a medium for example an optical disc. Reference numeral 102 represents a drive for a medium. Reference numeral 103 represents a host connected to the drive 102 through a drive-host interface 104. On the medium 101, information similar to that of the foregoing DVD medium is pre-recorded. The medium 101 may be not only a recordable type, but a read-only type. The host 103 sends a predetermined command to the drive 102 so as to control the operation of the drive 102. Commands that are used are commands described in the foregoing non-patent related art reference 2, extended commands, a READ command for reading a content from the medium 101 as sector data, and a WRITE command for writing a content as sector data to the medium 101.

The drive 102 has a device key 121 for the drive. The host 103 has a device key 131 for the host. The device key 121 is mainly placed in an LSI (Large Scale Integrated Circuit) and securely stored so that it cannot be read from the outside of the drive 102. The device key 131 may be securely stored in a software program or stored as hardware. To allow the drive 102 to be a valid drive that can handle the medium 101, the drive 102 requires secrete information of the copyright protection technology such as a device key according to the embodiment. Thus, a clone drive that pretends to be an authorized drive without a proper license can be prevented from being produced.

As shown in FIG. 5, the drive 102 has a process MKB 122 that inputs an MKB and the device key 121 and determines whether or not the device key of the drive has been revoked. Likewise, the host 103 has a process MKB 132. When the drive has not been revoked, a medium key Km is output from each of the process MKBs 122 and 132. After the revoke determining process has been performed and the medium key Km has been obtained. an authenticating process is performed.

Reference numerals 123, 124, and 125 represent MAC calculating blocks that calculate a MAC value using the medium key Km as a parameter. Reference numerals 126, 127, and 128 represent random number generators (RNGs). The random number generator 126 generates a random number Ra1. The random number generator 127 generates a random number Ra2. The random number generator 128 generates a random number Ra3. The random number generators 126, 127, and 128 are random number generators composed of for example an LSI. Thus, they can generate random numbers close to true random numbers in comparison with a method of which random numbers are generated by software. Although the random number generators may be composed of common hardware, random numbers Ra1, Ra2, and Ra3 are independent.

The host 103 has MAC calculating blocks 133, 134, and 135 and random number generators 136, 137, an 138. The MAC calculating blocks 133, 134, and 135 calculate MAC values using the medium key Km as a parameter. The random number generator 136 generates a random number Rb1. The random number generator 137 generates a random number Rb2. The random number generator 138 generates a random number Rb3. The random number generators 136, 137, and 138 are normally software that generates random numbers. Alternatively, the random number generators 136, 137, and 138 may be hardware that generate random numbers.

The random numbers generated in the drive 102 are exchanged with the random numbers generated in the host 103. In other words, the random number Ra1 and the random number Rb1 are input to each of the MAC calculating blocks 123 and 133. The random number Ra2 and the random number Rb2 are input to each of the MAC calculating blocks 124 and 134. The random number Ra3 and the random number Rb3 are input to each of the MAC calculating blocks 125 and 135.

The MAC value calculated by the MAC calculating block 123 of the drive 102 and the MAC value calculated by the MAC calculating block 133 of the host 103 are compared by a comparing portion 139 of the host 103. The comparing portion 139 determines whether or not the two values are the same. In this example, the MAC value is denoted by eKm (Ra1 || Rb1). eKm ( ) represents that data in parentheses is encrypted using the medium key Km as a key. The symbol Ra1 || Rb1 represents that two random numbers are combined so that the random number Ra1 is placed on the left side and the random number Rb1 is placed on the right side. When the compared result represents that the two values are the same, the host 103 has successfully authenticated the drive 102. Otherwise, the host 103 has not successfully authenticated the drive 102.

The MAC value calculated by the MAC calculating block 134 of the host 103 and the MAC value calculated by the MAC calculating block 124 of the drive 102 are compared by a comparing portion 129 of the drive 102. The comparing portion 129 determines whether or not the two values are the same. The MAC value is denoted by eKm(Rb2 || Ra2). When the compared result represents that the two values are the same, the drive 102 has successfully authenticated the host 103. Otherwise, the drive 102 has not successfully authenticated the host 103.

When the comparing portions 139 and 129 have determined that the MAC values are the same and it has been confirmed that the drive 102 and the host 103 are valid, namely mutual authentication has been successfully performed, the MAC calculating blocks 125 and 135 generate a common session key eKm(Ra3 || Rb3).

Next, with reference to flow charts shown in FIG. 6 and FIG. 7, a process of the mutual authentication will be described. First of all, at step ST20 shown in FIG. 7, the host 103 issues a command REPORT KEY and requests the drive 102 for the MKB. At step ST10 shown in FIG. 6, the drive 102 reads the MKB 112 from the medium 101 and transfers the MKB 112 to the host 103.

Thereafter, at step ST11, the drive 102 causes the process MKB 122 to calculate the medium key Km. At step ST21, the host 103 causes the process MKB 132 to calculate the medium key Km. In the calculating process, the drive 102 and the host 103 determine whether or not the device keys 121 and 31 represent that the drive 102 and the host 103 should be revoked (at step ST12 shown in FIG. 6 and step ST22 shown in FIG. 7).

When the drive 102 and the host 103 should be revoked, they are revoked and the process is completed. When the host 103 should not be revoked, at step ST23, the host 103 transfers the random number Rb1 and the random number Rb2 generated by the random number generators 136 and 137 to the drive 102 using a command SEND KEY. When the drive 102 should not be revoked, at step ST13, the drive 102 receives the random numbers transferred from the host 103.

Thereafter, the host 103 requests the drive 102 to transfer a response value of the MAC using the medium key Km of the drive 102 and the random number Ra1 generated by the random number generator 126 to the host 103 using a command REPORT KEY (at step ST24). This response value is denoted by eKm(Ra1 || Rb1). eKm ( ) represents that data in parentheses is encrypted using the medium key Km as an encryption key. The symbol Ra1 || Rb1 represents that two random numbers are combined so that the random number Ra1 is placed on the left side and the random number Rb1 is placed on the right side.

After the drive 102 has received the command REPORT KEY from the host 103, at step ST14, the drive 102 transfers the MAC value eKm(Ra1 || Rb1) and the random number Ra1 generated by the MAC calculating block 123 to the host 103. At step ST25, the host 103 causes the MAC calculating block 133 to calculate the MAC value and cause the comparing portion 139 to determine whether the calculated MAC value matches the MAC value received from the drive 102. When the received MAC value matches the calculated MAC value, the host 103 has successfully authenticated the drive 102. When the compared result at step ST25 represents that the MAC values do not match, the host 103 has not successfully authenticated the drive 102. As a result, a rejecting process is preformed.

When the host 103 has successfully authenticated the drive 102, at step ST26, the host 103 sends the command REPORT KEY to the drive 102 so as to request the drive 102 to transfer the random number Ra2 and the random number Ra3 generated by the random number generators 124 and 125 of the drive 102 to the host 103. In response to the command, at step ST15, the drive 102 transfers these random numbers to the host 103.

At step S27, the MAC calculating block 134 of the host 103 calculates a response value eKm(Rb2 || Ra2) of MAC using the random number received from the drive 102 and the medium key Km of the host 103 and transfers the response value eKm(Rb2 || Ra2) and the random number Rb3 to the drive 102 using the command SEND KEY.

At step ST16, when the drive 102 has received the response value eKm(Rb2 || Ra2) and the random number Rb3 from the host 103, the drive 102 calculates the MAC value by itself. At step ST17, the drive 102 causes the comparing portion 129 to determine whether or not the calculated MAC value matches the MAC value received from the host 103. When the received MAC value matches the calculated MAC value, the drive 102 has successfully authenticated the host 103. In this case, at step ST18, the MAC calculating block 125 generates the session key eKm(Rb3 || Ra3) and transmits information that represents that the host 103 has been successfully authenticated to the host 103. Thereafter, the authenticating process is completed. The session key is varied whenever the authenticating process is performed.

When the compared result at step ST17 represents that the MAC values do not match, the drive 102 has not successfully authenticated the host 103. At step ST19, error information that represents that the host 103 has not been successfully authenticated is transmitted to the host 103.

In response to the command SEND KEY, the host 103 receives information that represents whether or not the host 103 has been successfully authenticated from the drive 102. At step ST28, in accordance with the received information, the host 103 determines whether or not the authenticating process has been completed. When the host 103 has received the information that represents that the authentication has been successful, the host 103 determines that the authenticating process has been completed. When the host 103 has received information that represents that the authentication has not been successful, the host 103 determines that the authenticating process has not been completed. When the authenticating process has been completed, at step ST29, the MAC calculating block 135 generates a session key eKm(Ra3 || Rb3) (of for example 64 bits) that is in common with the drive side. When the authenticating process has not been completed, a rejecting process is performed. In the following description, the session key eKm(Ra3 || Rb3) is denoted by Ks.

In the mutual authentication according to the foregoing embodiment, the drive 102 is capable of having a revoking function. Thus, the drive 102 does not need a special authenticating key dedicated for authentication is not require.

When the recording and reproducing apparatus has a device key as information unique to an electronic device, the recording and reproducing apparatus can revoke itself.

In addition, the drive 102 causes the comparing portion 129 to confirm the authentication result of the host 103. Thus, the drive 102 is capable of determining whether or not it has been implemented after it had been correctly licensed by the host 103.

Next, with reference to FIG. 8, a structure of a recorder that integrates a drive 102 and a host 103 that perform the foregoing mutual authentication according to an embodiment will be described. In the recorder according to the embodiment, the drive 102 calculates a medium unique key and securely transfers the calculated medium unique to the host 103 using a session key Ks generated by the mutual authentication. In addition, the drive 102 generates a random number to obtain a content key. The drive 102 securely transfers the generated random number data to the host 103 using the session key Ks generated by the mutual authentication. The host 103 encrypts a content using a content key that the host 103 has obtained and transfers the encrypted content to the drive 102. The drive 102 records the encrypted content to the medium 101.

The drive 102 that composes the recorder has structural elements of a device key 121, a process MKB 122, a C2_G2 141, a DES (Data Encryption Standard) encryptor 142, a random number generator 143, and a DES encryptor 144.

The process MKB 122 calculates an MKB 112 reproduced from the medium 101 and the device key 121. As a result, it can be determined whether or not the drive 102 has been revoked. The process MKB 122 calculates the medium key using the MKB 112 and the device key 121. When the MKB 112 does not contain the device key 121 of the drive 102 and the calculated result matches a predetermined value for example zero, it is determined that the drive 102 that has the device key 121 is not valid. Thus, the drive 102 is revoked.

The C2_G 141 is a process for calculating the medium key and a medium ID 111 and obtaining a medium unique key as a calculated result. The DES encryptor 142 encrypts the medium unique key using a session key Ks. In this example, as an encrypting system, DES CBC mode is used. An output of the DES encryptor 142 is transmitted to a DES decryptor 151 of the host 103.

The random number generator 143 generates a title key. The title key generated by the random number generator 143 is input to the DES encryptor 144. The DES encryptor 144 encrypts the title key using a session key. The encrypted title key is transmitted to a DES decryptor 152 of the host 103.

The host 103 causes a DES decryptor 151 to decrypt the medium unique key using the session key Ks. A DES decryptor 152 decrypts the title key using the session key Ks. The medium unique key and the title key are supplied to a C2_E 153. The C2 encrypts the title key using the medium unique key. The encrypted title key 114 is recorded to the medium 101.

The CCI and the decrypted title key are supplied to a C2_G 154 of the host 103. The C2_G 154 obtains a content key. The content key is supplied to a C2_ECBC 155. The C2_ECBC 155 encrypts the content using the content key. The encrypted content denoted by reference numeral 113 is recorded to the medium 101.

Figure 9:
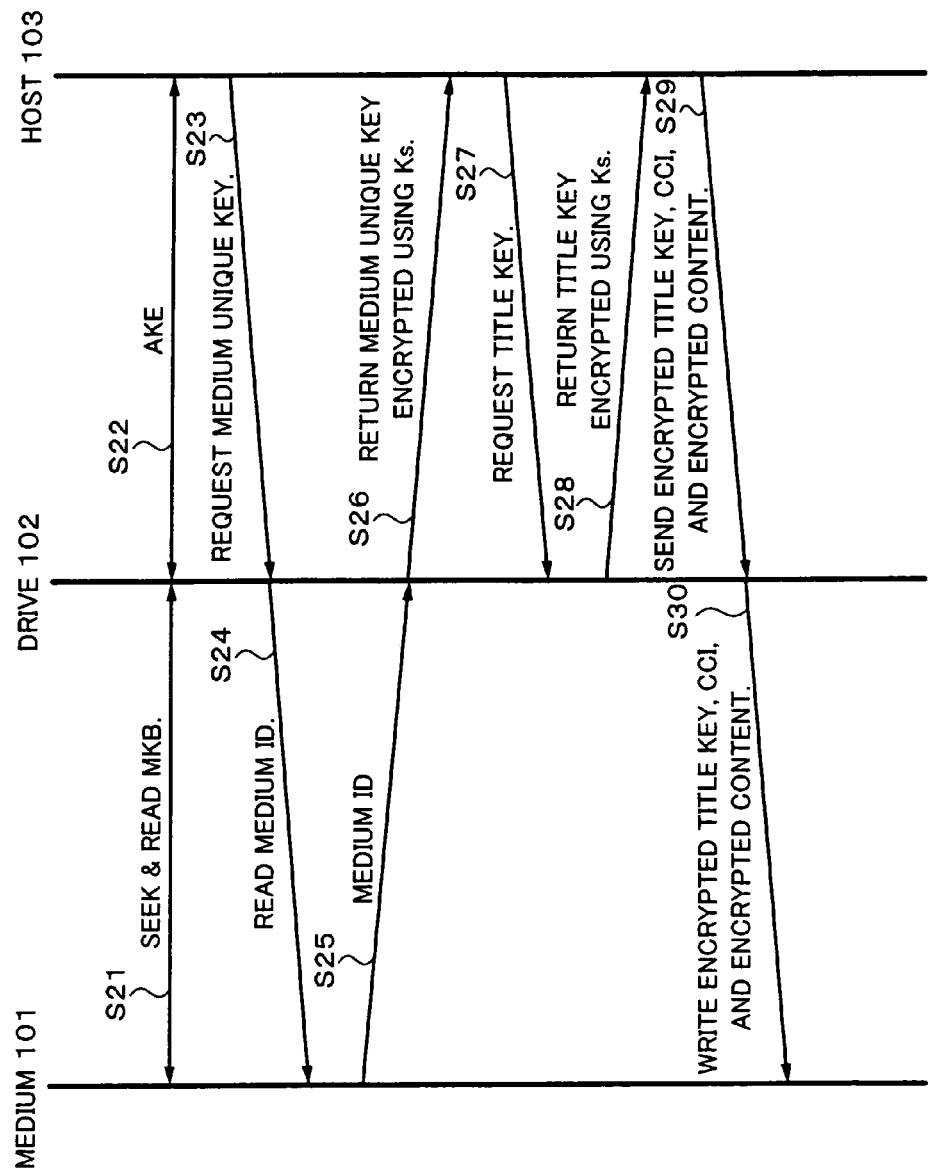
FIG. 9 is a schematic diagram describing an example of steps of a communicating procedure of the recorder.

FIG. 9 shows steps of a content recording procedure. First of all, the drive 102 seeks an MKB from the medium 101 and reads the MKB therefrom in response to a request from the host 103 (at step S21). At step S22, AKE (Authentication and Key Exchange) is performed. In other words, the foregoing revoking process and mutual authenticating operation of the drive 102 and the host 103 are performed.

The mutual authenticating operation is always performed whenever the power of the recorder is turned on and a disc is detected or whenever the current disc is replaced with another disc. Alternatively, when the record button is pressed for the recording operation or the play button is pressed for the reproducing operation, the authenticating operation may be performed. For example, when the record button or the play button is pressed, the authenticating operation is performed.

When the mutual authentication has not been successfully performed, a rejecting process is performed and for example the subsequent process of the recorder is stopped. When the mutual authentication has been successfully preformed, both the drive 102 and the host 103 generate a session key Ks and share it.

At step S23, the host 103 requests the drive 102 for a medium unique key. The drive 102 seeks a medium ID of the medium 101 (at step S24) and reads the medium ID from the medium 101 (at step S25). The drive 102 calculates the medium key and the medium ID so as to generate a medium unique key. At step S26, the medium unique key is encrypted using the session key Ks. The encrypted medium unique key is transferred to the host 103.

Next, at step S27, the host 103 requests the drive 102 for a title key. At step S28, the drive 102 encrypts the title key using the session key Ks and transfers the encrypted title key to the host 103. The host 103 decrypts the encrypted medium unique key and the encrypted title key using the session key Ks.

The title key is encrypted using the medium unique key. As a result, an encrypted title key is generated. In addition, a content is generated using the title key and a CCI. The content is encrypted using the content key. At step S29, the host 103 transfers the encrypted title key, the encrypted content, and the CCI to the drive 102. At step S30, the drive 102 records the encrypted title key, the encrypted content, and the CII to the medium 101.

Figure 8:
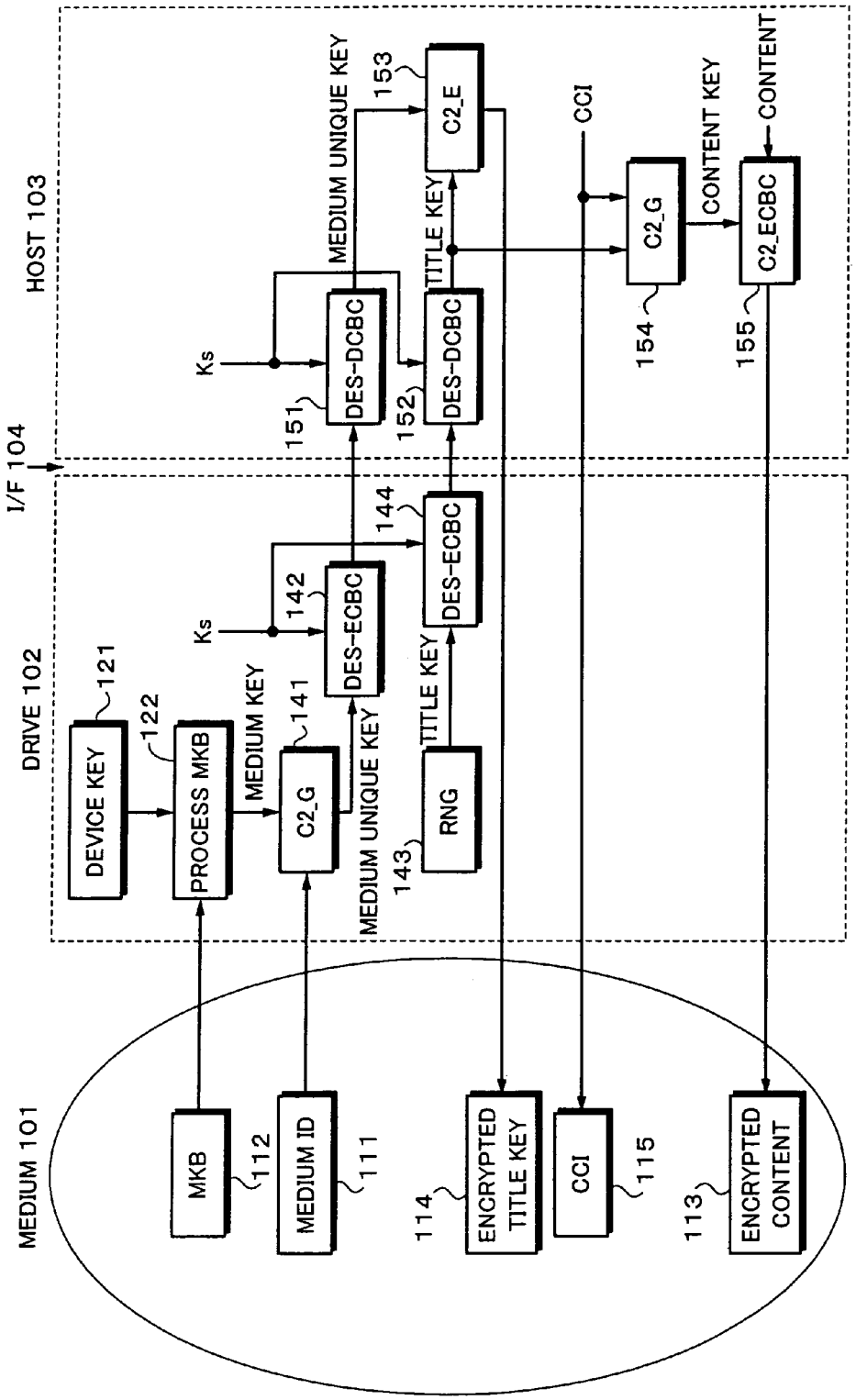
FIG. 8 is a block diagram showing an example of a structure of a recorder that integrates the drive and the host according to the embodiment of the present invention.

In the recorder having the structure shown in FIG. 8, the drive 102 causes the random number generator 143 to generate a title key. Alternatively, the host 103 may have a random number generator so as to generate a title key.

Figure 10:
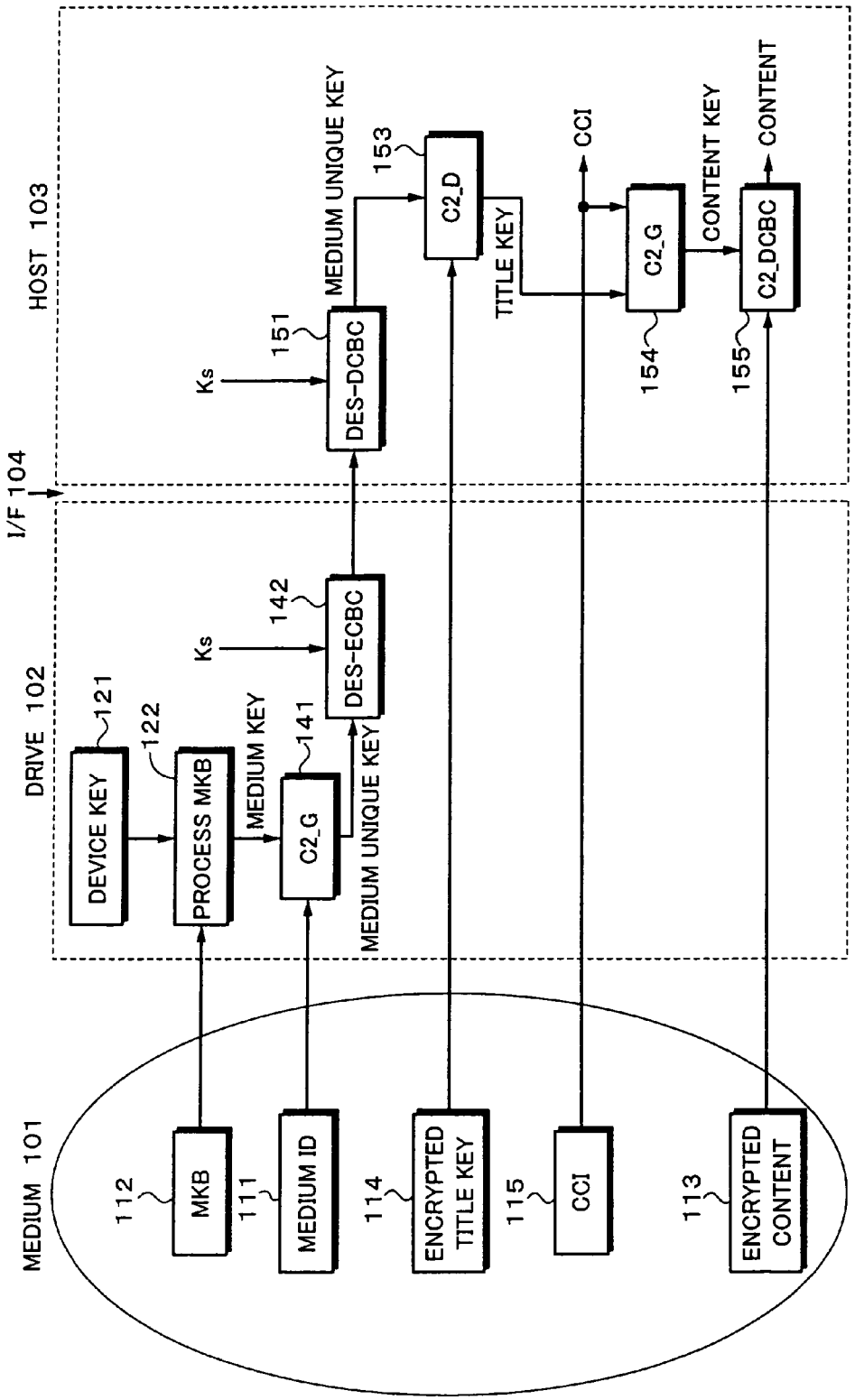
FIG. 10 is a block diagram showing an example of a structure of a player that integrates the drive and the host according to the embodiment of the present invention.

FIG. 10 shows a structure of a player that integrates a drive 102 and a host 103 that perform the foregoing mutual authentication according to an embodiment. The player according to the embodiment securely transfers a medium unique key calculated by the drive 102 to the host 103 using a session key Ks generated as a result of the mutual authentication of a medium unique key calculated by the drive 102. The host 103 decrypts an encrypted title key using the medium unique key and decrypts a content using a content key obtained using the title key and a CCI.

The drive 102 that composes the player has structural elements of a device key 121, a process MKB 122, a C2_G2 141, and a DES encryptor 142. The process MKB 122 calculates an MKB 112 reproduced from a medium 101 and the device key 121. As a result, it can be determined whether or not the drive 102 has been revoked. The process MKB 122 obtains a medium key using the MKB 112 and the device key 121.

The C2_G 141 is a process for calculating a medium key and a medium ID 111 and obtaining a medium unique key. The DES encryptor 142 encrypts the medium unique key using a session key Ks. In this example, as an encrypting system, DES CBS mode is used. An output of the DES encryptor 142 is transmitted to a DES descriptor 151 of the host 103.

In the host 103, the DES descriptor 151 decrypts the medium unique key using the session key Ks. The medium unique key and an encrypted title key 114 are supplied to a C2_D 153. The C2_D 153 decrypts the encrypted title key using the medium unique key. The decrypted title key and a CCI reproduced from the medium 101 are supplied to a C2_G 154. The C2_G 154 obtains a content key. A C2 decryptor 155 decrypts an encrypted content 113 reproduced from the medium 101 using the content key and obtains the content key.

Figure 11:
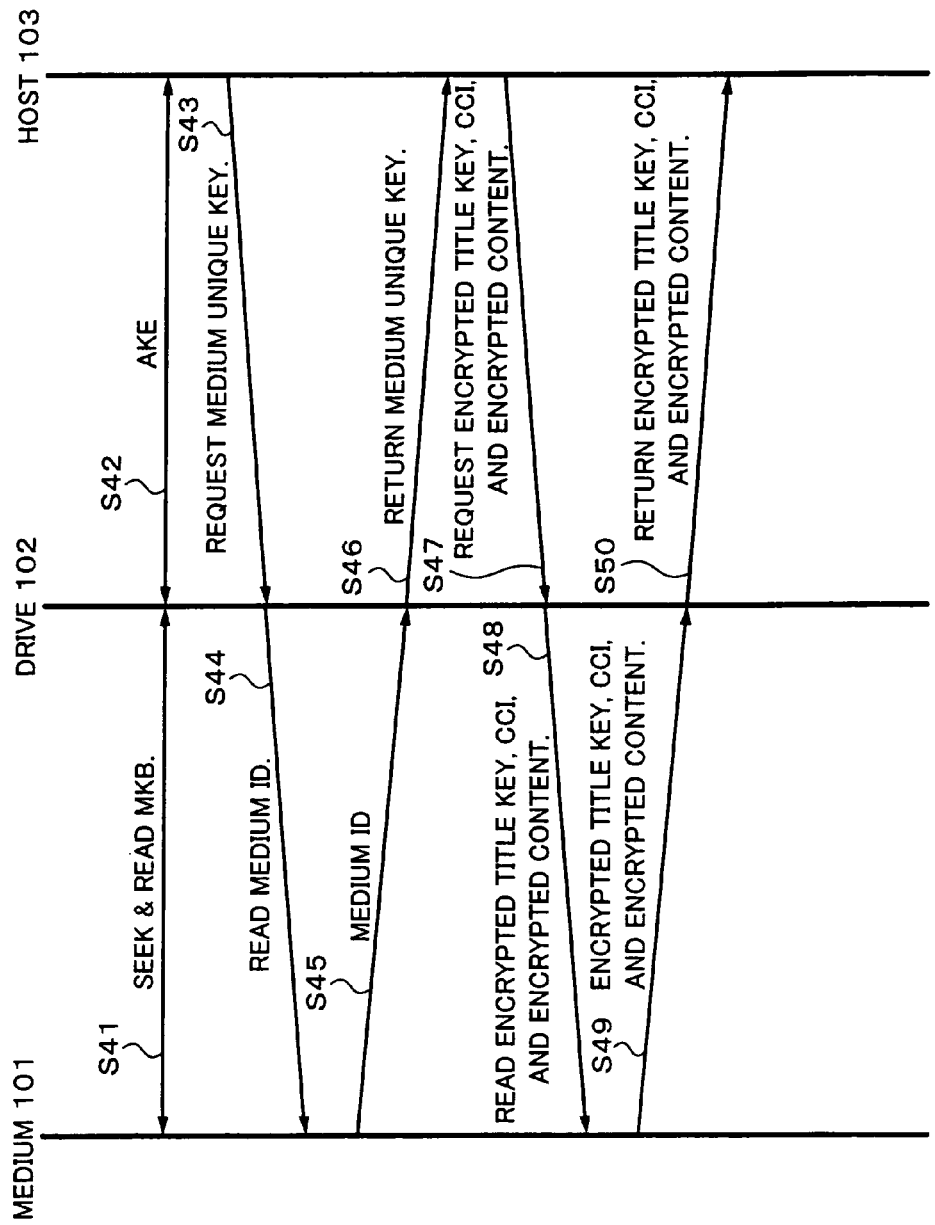
FIG. 11 is a schematic diagram describing an example of steps of a communicating procedure of the player.

FIG. 11 shows steps of a content reproducing procedure. First of all, the drive 102 seeks an MKB from the medium 101 and reads the MKB therefrom in response to a request from the host 103 (at step S41). An MKB is read for each pack. At step S42, AKE is performed. In other words, the foregoing revoking process and mutual authenticating operation of the drive 102 and the host 103 are preformed.

When the mutual authentication has not been successfully performed, a rejecting process is performed and for example the subsequence process is stopped. When the mutual authentication has been successfully performed, the drive 102 and the host 103 generate a session key Ks and share it.

At step S43, the host 103 requests the drive 102 for a medium unique key. The drive 102 seeks a medium ID from the medium 101 (at step S44). The drive 102 reads the medium ID from the medium 101 (at step S45). The drive 102 calculates the medium key and the medium ID and generates a medium unique key. At step S46, the medium unique key is encrypted using the session key Ks. The encrypted medium unique key is transferred to the host 103.

Thereafter, at step S47, the host 103 requests the drive 102 for an encrypted title key, a CCI, and an encrypted content. At step S48, the drive 102 reads an encrypted title key 114, a CCI 115, and an encrypted content 113 from the medium 101. At step S49, the drive 102 reads the encrypted title key 114, the CCI 115, and the encrypted content 113. At step S50, the drive 102 transfers the encrypted title key 114, the CCI 115, and the encrypted content 113 to the host 103.

The host 103 decrypts the title key and obtains a content key using the title key and the CCI. The host 103 decrypts the encrypted content using the content key.

In the player having the structure shown in FIG. 10, the host 103 has the decryptor C2_D 153 that decrypts an encrypted title key. Alternatively, the drive 102 may have a decryptor that decrypts an encrypted title key. In this case, a decrypted title key is securely transferred to the C2_G 154 of the host 103. The C2_G 154 generates a content key. Alternatively, the drive 102 may have a content key generating device C2_G so as to generate the content key using the decrypted title key and the CCI. In this case, the decrypted content key is securely transferred to the C2 decryptor 155 of the host 103.

Figure 12:
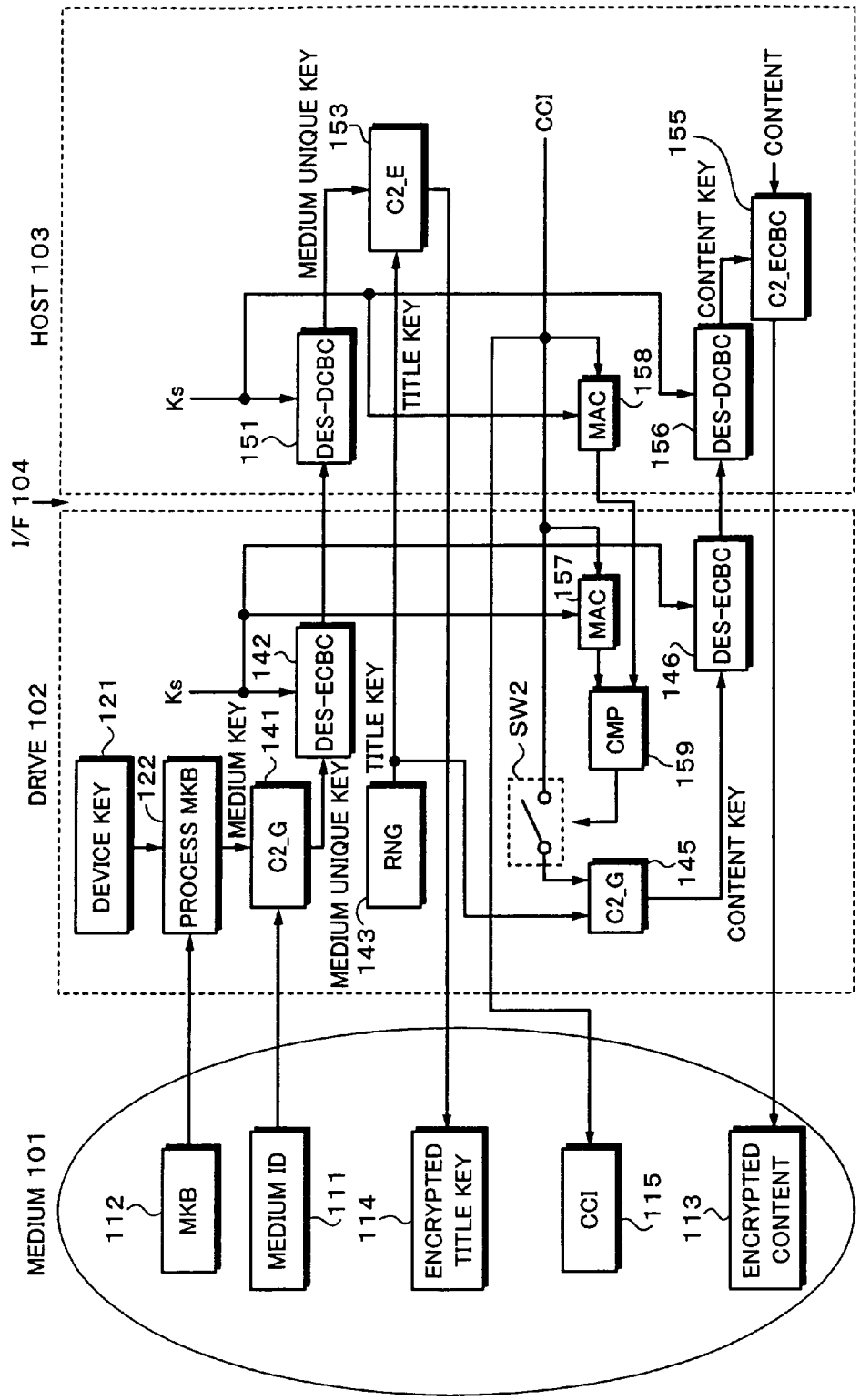
FIG. 12 is a block diagram showing another example of a structure of a recorder that integrates a drive and a host according to the embodiment of the present invention.

FIG. 12 shows a structure of a recorder that integrates a drive 102 and a host 103 that perform the foregoing mutual authentication according to another embodiment. The recorder according to the other embodiment securely transfers a medium unique key calculated by the drive 102 to the host 103 using a session key Ks generated by mutual authentication. The drive 102 generates a content key. The generated content key is securely transferred to the host 103 using the session key Ks. The host 103 encrypts a content using a decrypted content key and transfers the encrypted content to the drive 102. The drive 102 records the encrypted content to the medium 101. In other words, in the recorder shown in FIG. 8, the host 103 generates a content key. In contrast, according to the other embodiment, the drive 102 generates a content key.

As shown in FIG. 12, a process MKB 122 calculates an MKB 112 reproduced from the medium 101 and a device key 121. As a result, a medium key is obtained. A C2_G 141 calculates the medium key and the medium ID 111 and obtains a medium unique key. A DES encryptor 142 encrypts the medium unique key using the session key Ks. An output of the DES encryptor 142 is transmitted to a DES descriptor 151 of the host 103. The DES descriptor 151 obtains a medium unique key.

In addition, a random number generator 143 of the drive 102 generates a title key. The title key generated by the random number generator 143 is supplied to a C2_E 153 of the host 103. The C2 encrypts the title key using the medium unique key. The encrypted title key denoted by reference numeral 114 is recorded to the medium 101.

The host 103 causes a MAC calculating block 158 to calculate a MAC value eKs(CCI) of a CCI using the session key Ks. The MAC value eKs(CCI) and the CCI are transferred to the drive 102.

The drive 102 causes a MAC calculating block 157 to calculate a MAC value eKs(CCI) of the CCI using the CCI received from the host 103 and the session key Ks. The calculated MAC value eKs(CCI) and the MAC value received from the host 103 are supplied to a comparing portion 159.

When both the MAC values match, the comparing portion 159 determines that the CCI received from the host 103 has not been tampered. As a result, the drive 102 turns on a switch SW2. In contrast, when the MAC values do not match, the comparing portion 159 determines that the CCI has been tampered. At that point, the drive 102 turns off the switch SW2 and stops the subsequent process.

In the drive 102, the CCI received from the host 103 and the title key are supplied to a C2_G 145. The C2_G 145 obtains a content key. The content key is supplied to a DES encryptor 146. The DES encryptor 146 encrypts the content key using the session key Ks. The encrypted content key is transferred to a DES decryptor 156 of the host 103.

The content key decrypted by the DES decryptor 156 using the session key Ks is supplied to a C2_ECBC 155. The C2_ECBC 155 encrypts a content using the content key. The encrypted content denoted by reference numeral 113 is transferred to the drive 102. The drive 102 records the encrypted content 113 to the medium 101.

In the recorder shown in FIG. 12, the random number generator 143 of the drive 102 generates a title key. Alternatively, a random number generator may be disposed on the host 103 side. The random number generator may generate a title key. In this case, the generated title key is transferred from the host 103 to the C2_G145, which generates a content key, of the drive 102.

Figure 13:
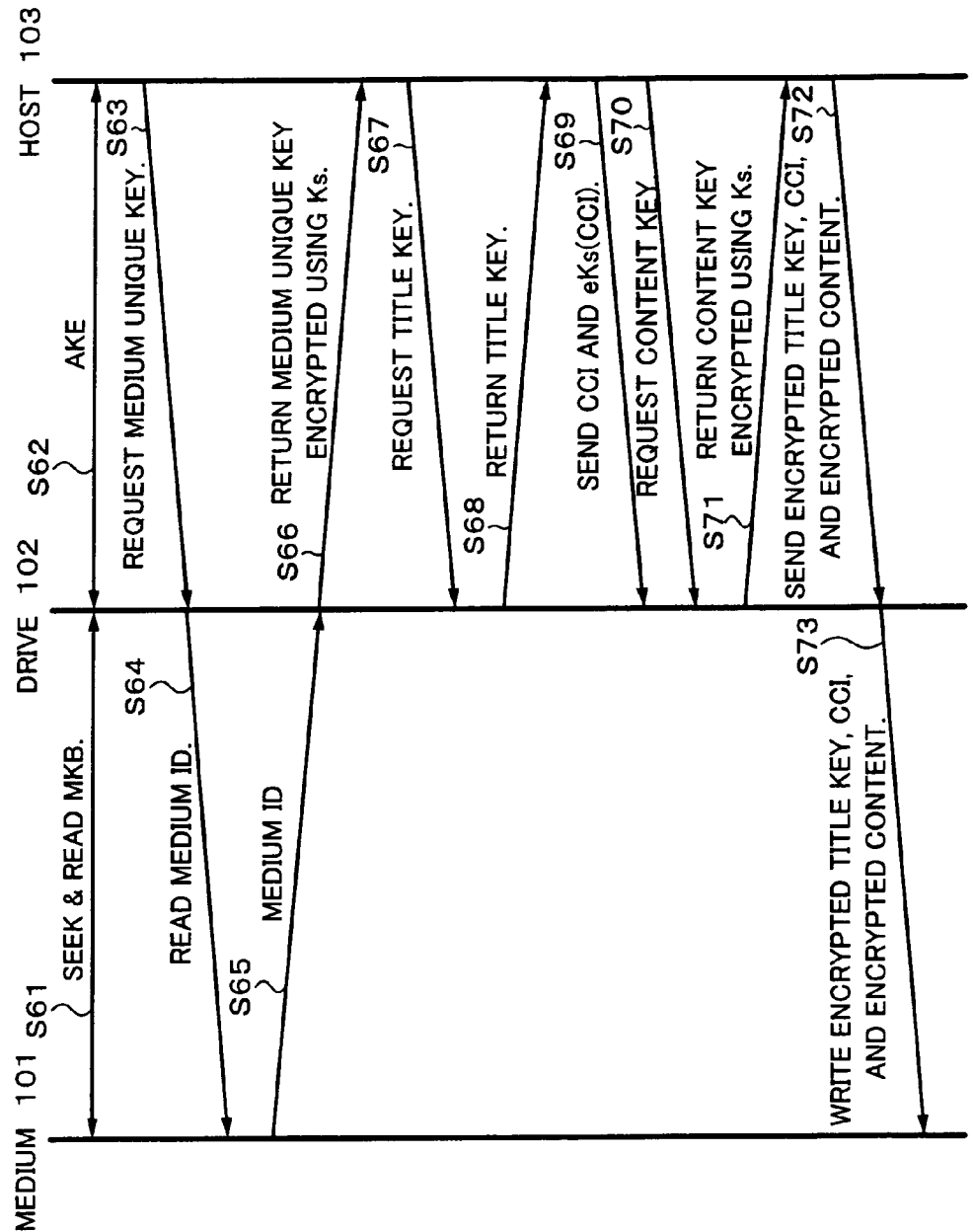
FIG. 13 is a schematic diagram describing another example of steps of a communicating procedure of the recorder.

FIG. 13 shows steps of a content recording procedure of the recorder according to the other embodiment. First of all, the drive 102 seeks an MKB from the medium 101 and reads the MKB therefrom in response to a request from the host 103 (at step S61). At step S62, AKE is performed. In other words, a revoking process and mutual authenticating operation of the drive 102 and the host 103 are performed.

When the mutual authentication has not been successfully performed, a rejecting process is performed and for example the subsequent process is stopped. When the mutual authentication has been successfully preformed, both the drive 102 and the host 103 generate a session key Ks and share it.

At step S63, the host 103 requests the drive 102 for a medium unique key. The drive 102 seeks a medium ID of the medium 101 (at step S64) and reads the medium ID from the medium 101 (at step S65). The drive 102 calculates the medium key and the medium ID so as to generate a medium unique key. At step S66, the medium unique key is encrypted using the session key Ks. The encrypted medium unique key is transferred to the host 103.

Next, at step S67, the host 103 requests the drive 102 for a title key. At step S68, the drive 102 transfers the title key to the host 103. The host 103 decrypts the encrypted medium unique key using the session key Ks. The host 103 encrypts the title key using the medium unique key and generates an encrypted title key.

At step S69, the host 103 sends a CCI to the drive 102. At that point, to prevent the CCI from being tampered, the host 103 transfers a MAC value eKs(CCI) calculated as authentication data of the CCI to the drive 102. After the drive 102 has determined that the CCI had not been tampered, the drive 102 generates a content key using the title key and the CCI and encrypts the content key using the session key Ks. At step S70, the host 103 requests the drive 102 for the content key. At step S71, the drive 102 sends the encrypted content key to the host 103.

The host 103 decrypts the encrypted content key using the session key Ks and obtains the content key. The host 103 encrypts a content using the content key. At step S72, the host 103 transfers the encrypted title key, the encrypted content, and the CCI to the drive 102. At step S73, the drive 102 records the encrypted title key, the encrypted content, and the CCI to the medium 101.

In the recorder having the structure shown in FIG. 12, a true random number or a random number close thereto can be generated by hardware for example an LSI of the drive 102. As a result, it becomes difficult to replace a generated random number with a fixed value. In addition, in the drive 102, a content key is generated by hardware. Thus, copyright protection can be securely implemented.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, a title key is a key for each title. However, according to the present invention, as long as the title key is random number information, the title key does not need to differ in each title.

The foregoing description exemplifies the CPRM as a copyright protection technology and an extended CPRM. However, the present invention can be applied to other than the CPRM as a copyright protection technology. For example, the present invention can be applied to a copyright protection technology based on a tree-type key distribution structure as proposed in for example Japanese Patent Laid-Open Publication No. 2001-352322. In addition, the present invention can be applied to a PC based system. However, it should be noted that the present invention is not limited to a structure of which a PC and a drive are combined. For example, the present invention can be applied to a portable moving picture or still picture camera having an optical disc as a medium, a drive that drives the medium, and a microcomputer that controls the drive.

According to the present invention, mutual authentication is performed using key information (medium key) of which key information (MKB) recorded on a medium and key information (device key) stored in each device or each application are obtained as the same value. Thus, according to the present invention, since a special authentication key dedicated for authentication is not required, the amount of secret information can be decreased. In addition, since a device or an application has a device key that can be varied, the risk of which secret information is illegally read can be decreased.

According to the present invention, information unique to an electronic device or application software for example device key that is secret information of a copyright protection technology is implemented in the drive. Thus, application software installed in the information processing apparatus does not need to have all secret information of the copyright protection technology. Thus, the system according to the present invention is capable of having tamper-resistance for secret information against reverse-engineering for software. In addition, since encrypted data that is read from the disc can be prevented from being decrypted by decrypting software such as "DeCSS" and non-encrypted clear content from being repeatedly copied without copy restriction. Thus, safety of the copyright protection technology can be secured.

Since the recording and reproducing apparatus has a device key as information unique to an electronic device, the recording and reproducing apparatus itself can be revoked.

According to the present invention, since random number information necessary for calculating a content key in the information processing apparatus can be generated by for example an LSI of the recording and reproducing apparatus, a true random number or a random number close thereto can be generated in comparison with the case that a random number is generated by software in a PC. Thus, the risk of which a random number is replaced with a fixed value can be suppressed.

The invention claimed is:

1. A mutually authenticating method for mutually authenticating a reproducing apparatus and an information processing apparatus, the reproducing apparatus including a reproducing portion for reading content information from a recording medium including revocation information and information unique to the recording medium, the revocation information used to determine whether or not an electronic device is illegal, the reproducing apparatus configured to transmit and receive the content information to and from the information processing apparatus for processing the content information, the mutually authenticating method comprising:

causing the reproducing apparatus to determine whether or not the reproducing apparatus itself should be invalidated using information that represents the reproducing apparatus and the revocation information;

causing the information processing apparatus to determine whether or not the information processing apparatus itself should be invalidated using the information that represents the information processing apparatus and the revocation information; and causing the reproducing apparatus and the information processing apparatus to mutually authenticate each other using both first key information generated when a determined result of the reproducing apparatus does not represent that the reproducing apparatus should be invalidated and second key information generated when a determined result of the information processing apparatus does not represent that information processing apparatus should be invalidated.

2. The mutually authenticating method as set forth in claim 1, wherein the causing the reproducing apparatus and the information processing apparatus to mutually authenticate each other comprises:

causing the reproducing apparatus to confirm whether or not the information processing apparatus normally operates through a transferring means; and causing the information processing apparatus to confirm whether or not the reproducing apparatus normally operates through the transferring means.

3. The mutually authenticating method as set forth in claim 2, further comprising:

causing the reproducing apparatus to generate a first random number and a third random number;

causing the reproducing apparatus to perform a predetermined calculation;

causing the information processing apparatus to generate a second random number and a fourth random number; and causing the information processing apparatus to perform a predetermined calculation, wherein the causing the reproducing apparatus to confirm includes causing the reproducing apparatus and the information processing apparatus to mutually exchange the first random number and the second random number, and causing the reproducing apparatus to compare a result calculated by the reproducing apparatus using at least the first key information, the first random number, and the second random number, the first random number and the second random number having been mutually exchanged, with a result calculated by the information processing apparatus using at least the second key information, the first random number, and the second random number, the second key information, the first random number, and the second random number having been transmitted from the information processing apparatus through the transferring means, the first random number and the second random number having been mutually exchanged, and the causing the information processing apparatus to confirm includes causing the reproducing apparatus and the information processing apparatus to mutually exchange the third random number and the fourth random number, and causing the information processing apparatus to compare a result calculated by the reproducing apparatus using at least the first key information, the third random number, and the fourth random number, the first key information, the third random number, and the fourth random number having been transmitted from the reproducing apparatus through the transferring means, the third random number and the fourth random number having been mutually exchanged, with a result calculated by the information processing apparatus using at least the second key information, the third random number, and the fourth random number, the third random number and the fourth random number having been mutually exchanged.

4. A computer-readable medium including computer executable instructions, wherein the instructions, when executed by a processor, cause the processor to perform a mutually authenticating method for mutually authenticating a reproducing apparatus and an information processing apparatus, the reproducing apparatus including a reproducing portion for reading content information from a recording medium including revocation information and information unique to the recording medium, the revocation information used to determine whether or not an electronic device is illegal, the reproducing apparatus configured to transmit and receive the content information to and from the information processing apparatus for processing the content information, the mutually authenticating method comprising:

causing the reproducing apparatus to determine whether or not the reproducing apparatus itself should be invalidated using information that represents the reproducing apparatus and the revocation information;

causing the information processing apparatus to determine whether or not the information processing apparatus itself should be invalidated using the information that represents the information processing apparatus and the revocation information; and causing the reproducing apparatus and the information processing apparatus to mutually authenticate each other using both first key information generated when a determined result of the reproducing apparatus does not represent that the reproducing apparatus should be invalidated and second key information generated when a determined result of the information processing apparatus does not represent that information processing apparatus should be invalidated.

5. A signal processing system comprising:

a reproducing apparatus; and an information processing apparatus, wherein the reproducing apparatus includes a reproducing portion for reading content information from a recording medium including revocation information and information unique to the recording medium, the revocation information used to determine whether or not an electronic device is illegal, the reproducing apparatus configured to transmit and receive the content information to and from the information processing apparatus for processing the content information, the reproducing apparatus further including first determining means for determining whether or not the reproducing apparatus itself should be invalidated using information that represents the reproducing apparatus and the revocation information, the information processing apparatus including second determining means for determining whether or not the information processing apparatus itself should be invalidated using information that represents the information processing apparatus and the revocation information, the signal processing system includes mutually authenticating means for causing the reproducing apparatus and the information processing apparatus to mutually authenticate each other using both first key information generated when a determined result of the first determining means does not represent that the reproducing apparatus should be invalidated and second key information generated when a determined result of the second determining means does not represent that the information processing apparatus should be invalidated, and common key generating means for generating a common key that is in common with the reproducing apparatus and the information processing apparatus after the mutually authenticating means has mutually authenticated the reproducing apparatus and the information processing apparatus.

6. The signal processing system as set forth in claim 5, wherein the mutually authenticating means comprises:

first confirming means for confirming whether or not the information processing apparatus normally operates through a transferring means; and second confirming means for confirming whether or not the reproducing apparatus normally operates through the transferring means.

7. The signal processing system as set forth in claim 6, wherein the reproducing apparatus further includes first random number generating means for generating a random number, and first calculating means for performing a predetermined calculation, the information processing apparatus further includes second random number generating means for generating a random number, and second calculating means for performing a predetermined calculation, the first confirming means includes first random number exchanging means for mutually exchanging a first random number generated by the first random number generating means with a second random number generated by the second random number generating means between the reproducing apparatus and the information processing apparatus, and first comparing means for comparing a result calculated by the first calculating means of the reproducing apparatus using at least the first key information, the first random number, and the second random number, the first random number and the second random number having been mutually exchanged, with a result calculated by the second calculating means of the information processing apparatus using at least the second key information, the first random number, and the second random number, the second key information, the first random number, and the second random number having been transmitted from the information processing apparatus through the transferring means, the first random number and the second random number having been mutually exchanged, and the second confirming means includes second random number exchanging means for mutually exchanging a third random number generated by the first random number generating means with a fourth random number generated by the second random number generating means, and second comparing means for comparing a result calculated by the first calculating means of the reproducing apparatus using at least the first key information, the third random number, and the fourth random number, the first key information, the third random number, and the fourth random number having been transmitted from the reproducing apparatus through the transferring means, the third random number and the fourth random number having been mutually exchanged, with a result calculated by the second calculating means of the information processing apparatus using at least the second key information, the third random number, and the fourth random number, the third random number and the fourth random number having been mutually exchanged.

8. The signal processing system as set forth in claim 7, wherein the common key generating means comprises:

third random number exchanging means for mutually exchanging a fifth random number generated by the first random number generating means with a sixth random number generated by the second random number generating means between the reproducing apparatus and the information processing apparatus;

first common key generating means for generating the common key for the reproducing apparatus using at least the first key information, the fifth random number, and the sixth random number; and second common key generating means for generating the common key for the information processing apparatus using at least the second key information, the fifth random number, and the sixth random number.

9. The signal processing system as set forth in claim 8, further comprising first transmitting means for transmitting information from the reproducing apparatus to the information processing apparatus through the transferring means in accordance with a common key encrypting system using the common key, the reproducing apparatus further including intermediate key information generating means for generating key information unique to the recording medium using the first key information and the information unique to the recording medium.

10. The signal processing system as set forth in claim 9, further comprising:
key information encrypting means for encrypting third key information using at least the key information unique to the recording medium;
encryption key information recording means for recording the third key information encrypted by the key information encrypting means to the recording medium;
final encryption key generating means for generating a content information encryption key in accordance with the third key information; and
content information recording means for recording content information encrypted using the content information encryption key to the recording medium.

11. The signal processing system as set forth in claim 10, wherein the information processing apparatus comprises the key information encrypting means, the encryption key information recording means, the final encryption key generating means, and the content information recording means, and
the first transmitting means transmits the key information unique to the recording medium to the information processing apparatus.

12. The signal processing system as set forth in claim 11, wherein the third key information is key information in accordance with a seventh random number generated by the first random number generating means of the reproducing apparatus, and
the first transmitting means transmits the third key information to the information processing apparatus.

13. The signal processing system as set forth in claim 11, wherein the third key information is key information in accordance with an eighth random number generated by the second random number generating means of the information processing apparatus.

14. The signal processing system as set forth in claim 10, wherein the information processing apparatus includes the key information encrypting means, the encryption key information recording means, and the content information recording means,
the first transmitting means transmit the key information unique to the recording medium to the information processing apparatus,
the reproducing apparatus comprises the final encryption key generating means, and
the first transmitting means transmits the content information encryption key generated by the final encryption key generating means to the information processing apparatus.

15. The signal processing system as set forth in claim 14, wherein the third key information is key information in accordance with a ninth random number generated by the first random number generating means of the reproducing apparatus.

16. The signal processing system as set forth in claim 14, wherein the third key information is key information in accordance with a tenth random number generated by the second random number generating means of the information processing apparatus, and
the signal processing system further includes
second transmitting means for transmitting information from the information processing apparatus to the final encryption key generating means of the reproducing apparatus through the transferring means in accordance with the common key encrypting system using the common key.

17. The signal processing apparatus as set forth in claim 9, further comprising:
key information decrypting means for decrypting fourth key information that has been encrypted and read from the recording medium using at least the key information unique to the recording medium;
final decryption key generating means for generating a content information decryption key in accordance with the fourth key information; and
content information decrypting means for decrypting the content information using the content information decryption key.

18. The signal processing system as set forth in claim 17, wherein the information processing apparatus comprises the final decryption key generating means and the content information decrypting means.

19. The signal processing system as set forth in claim 18, wherein the information processing apparatus comprises the key information decrypting means, and
first transmitting means transmits the key information unique to the recording medium to the information processing apparatus.

20. The signal processing system as set forth in claim 18, wherein the reproducing apparatus comprises the key information decrypting means, and
the first transmitting means transmits decrypted fourth key information to the information processing apparatus.

21. The signal processing system as set forth in claim 17, wherein the reproducing apparatus comprises the final decryption key generating means.

22. The signal processing system as set forth in claim 21, wherein the reproducing apparatus comprises the key information decrypting means, and
first transmitting means transmits the content information decryption key generated by the reproducing apparatus to the information processing apparatus.

23. A reproducing apparatus for a signal processing system, the reproducing apparatus including a reproducing portion for reading content information from a recording medium including revocation information and information unique to the recording medium, the revocation information used to determine whether or not an electronic device is illegal, the reproducing apparatus configured to transmit the content information to an information processing apparatus for processing the content information,
the reproducing apparatus comprising:
first determining means for determining whether or not the reproducing apparatus itself should be invalidated using information that represents the reproducing apparatus and the revocation information;
mutually authenticating means for mutually authenticating the information processing apparatus using both first key information generated when a determined result of the first determining means does not represent that the reproducing apparatus should be invalidated and second key information generated when a determined result of a second determining means does not represent that the information processing apparatus should be invalidated; and
common key generating means for generating a common key that is in common with the information processing apparatus after the mutually authenticating means has mutually authenticated the information processing apparatus.

24. An information processing apparatus for receiving content information from a reproducing apparatus through transferring means, the content information read from a recording medium including revocation information and information unique to the recording medium, the revocation information used to determine whether or not an electronic device is illegal, the information processing apparatus being configured to process the content information, the information processing apparatus comprising:

second determining means for determining whether or not the information processing apparatus itself should be invalidated using first key information, information that represents the information processing apparatus, and the revocation information, the first key information generated when a determined result of first determining means of the reproducing apparatus does not represent that the reproducing apparatus itself should be invalidated using information that represents the reproducing apparatus and the revocation information;

mutually authenticating means for mutually authenticating the reproducing apparatus using both the first key information and second key information generated when a determined result of the second determining means does not represent that the information processing apparatus itself should be invalidated; and common key generating means for generating a common key that is in common with the reproducing apparatus after the mutually authenticating means has mutually authenticated the reproducing apparatus.

25. A signal processing system comprising:

a reproducing apparatus configured to transmit and receive content information to and from an information processing apparatus, the reproducing apparatus including a reproducing portion configured to read the content information from a recording medium including revocation information and information unique to the recording medium, the revocation information used to determine whether or not an electronic device is illegal, and a first determining unit configured to determine whether or not the reproducing apparatus itself should be invalidated using information that represents the reproducing apparatus and the revocation information;

the information processing apparatus configured to process the content information, including a second determining unit configured to determine whether or not the information processing apparatus itself should be invalidated using information that represents the information processing apparatus and the revocation information;

a mutually authenticating unit configured to cause the reproducing apparatus and the information processing apparatus to mutually authenticate each other using both first key information generated when a determined result of the first determining unit does not represent that the reproducing apparatus should be invalidated and second key information generated when a determined result of the second determining unit does not represent that the information processing apparatus should be invalidated; and a common key generating unit configured to generate a common key that is in common with the reproducing apparatus and the information processing apparatus after the mutually authenticating unit has mutually authenticated the reproducing apparatus and the information processing apparatus.

26. A reproducing apparatus for a signal processing system, the reproducing apparatus including a reproducing portion for reading content information from a recording medium including revocation information and information unique to the recording medium, the revocation information used to determine whether or not an electronic device is illegal, the reproducing apparatus configured to transmit the content information to an information processing apparatus for processing the content information, the reproducing apparatus comprising:

a first determining unit configured to determine whether or not the reproducing apparatus itself should be invalidated using information that represents the reproducing apparatus and the revocation information;

a mutually authenticating unit configured to mutually authenticate the information processing apparatus using both first key information generated when a determined result of the first determining unit does not represent that the reproducing apparatus should be invalidated and second key information generated when a determined result of a second determining unit does not represent that the information processing apparatus should be invalidated; and a common key generating unit configured to generate a common key that is in common with the information processing apparatus after the mutually authenticating unit has mutually authenticated the information processing apparatus.

27. An information processing apparatus for receiving content information from a reproducing apparatus through transferring means, the content information read from a recording medium including revocation information and information unique to the recording medium, the revocation information used to determine whether or not an electronic device is illegal, the information processing apparatus configured to process the content information, the information processing apparatus comprising:

a second determining unit configured to determine whether or not the information processing apparatus itself should be invalidated using first key information, information that represents the information processing apparatus, and the revocation information, the first key information generated when a determined result of a first determining unit of the reproducing apparatus does not represent that the reproducing apparatus itself should be invalidated using information that represents the reproducing apparatus and the revocation information;

a mutually authenticating unit configured to mutually authenticate the reproducing apparatus using both the first key information and second key information generated when a determined result of the second determining unit does not represent that the information processing apparatus itself should be invalidated; and a common key generating unit configured to generate a common key that is in common with the reproducing apparatus after the mutually authenticating unit has mutually authenticated the reproducing apparatus.

* * * * *